(12) United States Patent
Imai

(10) Patent No.: US 7,782,366 B2
(45) Date of Patent: Aug. 24, 2010

(54) BACKLIGHT ADJUSTMENT PROCESSING OF IMAGE USING IMAGE GENERATION RECORD INFORMATION

(75) Inventor: Toshie Imai, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1530 days.

(21) Appl. No.: 10/665,678

(22) Filed: Sep. 19, 2003

(65) Prior Publication Data

US 2004/0119874 A1    Jun. 24, 2004

(30) Foreign Application Priority Data

Sep. 20, 2002    (JP)    ............... 2002-274318

(51) Int. Cl.
*H04N 5/228*    (2006.01)
(52) U.S. Cl. .............. 348/222.1; 348/207.1; 348/207.2; 348/231.3
(58) Field of Classification Search ............... 348/362, 348/231.3–231.6, 222.1
See application file for complete search history.

(56) References Cited

U.S. PATENT DOCUMENTS

| | | | |
|---|---|---|---|
| 5,224,177 A | 6/1993 | Doi et al. | |
| 5,263,098 A | 11/1993 | Horikami | |
| 5,940,530 A | 8/1999 | Fukushima et al. | |
| 6,011,547 A | 1/2000 | Shiota et al. | |
| 6,023,524 A * | 2/2000 | Yamaguchi | 382/162 |
| 6,097,836 A | 8/2000 | Inoue | |
| 6,249,362 B1 * | 6/2001 | Sato et al. | 358/527 |
| 6,463,173 B1 | 10/2002 | Tretter | |
| 6,654,062 B1 * | 11/2003 | Numata et al. | 348/362 |
| 6,690,424 B1 * | 2/2004 | Hanagata et al. | 348/364 |
| 6,879,345 B2 | 4/2005 | Kawanishi | |
| 7,034,881 B1 * | 4/2006 | Hyodo et al. | 348/333.12 |
| 7,145,597 B1 * | 12/2006 | Kinjo | 348/222.1 |
| 7,262,798 B2 * | 8/2007 | Stavely et al. | 348/255 |
| 7,400,354 B2 | 7/2008 | Kawanishi | |
| 7,403,231 B2 | 7/2008 | Kawanishi | |
| 7,486,312 B2 * | 2/2009 | Imai | 348/222.1 |
| 7,518,643 B2 | 4/2009 | Kawanishi | |
| 7,570,840 B2 * | 8/2009 | Imai | 382/286 |
| 2001/0007599 A1 | 7/2001 | Iguchi et al. | |
| 2002/0008771 A1 * | 1/2002 | Uchino et al. | 348/362 |
| 2002/0106206 A1 | 8/2002 | Takeshita | |

(Continued)

FOREIGN PATENT DOCUMENTS

CN    1311604    9/2001

(Continued)

OTHER PUBLICATIONS

L.R. Hanlon et al., "Generating Scene-Referred Data In a Digital Still Camera," *Proc. IS&T PICS Conference*, 2001, pp. 271-276 (XP-001060280).

(Continued)

*Primary Examiner*—Ngoc-Yen T Vu
(74) *Attorney, Agent, or Firm*—Martine Penilla & Gencarella, LLP

(57) ABSTRACT

A decision as to whether to perform backlight adjustment processing is executed using both image data and image generation record information, and when it is decided to execute the same, backlight adjustment processing to increase brightness value of at least some pixels in the image data is executed.

5 Claims, 24 Drawing Sheets

U.S. PATENT DOCUMENTS

| | | | |
|---|---|---|---|
| 2002/0167592 A1* | 11/2002 | Toyoda et al. | 348/207.1 |
| 2003/0142224 A1* | 7/2003 | Fukuda et al. | 348/231.3 |
| 2003/0215220 A1 | 11/2003 | Ohmura et al. | |
| 2004/0101296 A1* | 5/2004 | Nakata et al. | 396/65 |

FOREIGN PATENT DOCUMENTS

| | | |
|---|---|---|
| EP | 0 889 638 | 1/1999 |
| EP | 0 905 964 | 3/1999 |
| EP | 1 128 660 | 8/2001 |
| EP | 1 241 870 | 9/2002 |
| EP | 1 292 108 | 3/2003 |
| EP | 1 296 510 | 3/2003 |
| EP | 1 404 118 | 3/2004 |
| JP | 09-284138 | 10/1997 |
| JP | 10-079885 | 3/1998 |
| JP | 11-120325 | 4/1999 |
| JP | 11-127415 | 5/1999 |
| JP | 11-136568 | 5/1999 |
| JP | 11-243484 | 9/1999 |
| JP | 2002-006390 | 1/2002 |
| JP | 2002-185771 | 6/2002 |

OTHER PUBLICATIONS

Abstract of Japanese Patent Publication No. 09-284138, Pub. Date: Oct. 31, 1997, Patent Abstracts of Japan.

Abstract of Japanese Patent Publication No. 10-079885, Pub. Date: Mar. 24, 1998, Patent Abstracts of Japan.

Abstract of Japanese Patent Publication No. 11-120325, Pub. Date: Apr. 30, 1999, Patent Abstracts of Japan.

Abstract of Japanese Patent Publication No. 11-127415 Pub. Date: May 11, 1999, Patent Abstracts of Japan.

Abstract of Japanese Patent Publication No. 11-243484 Pub. Date: Sep. 7, 1999, Patent Abstracts of Japan.

Abstract of Japanese Patent Publication No. 2002-006390 Pub. Date: Jan. 9, 2002, Patent Abstracts of Japan.

Abstract of Japanese Patent Publication No. 2002-185771 Pub. Date: Jun. 28, 2002, Patent Abstracts of Japan.

Abstract of Chinese Patent Publication No. CN 1311604 Pub. Date: Sep. 5, 2001, esp@cenet internet database.

Abstract of Japanese Patent Publication No. 2002-006390, Publication Date: Jan. 9, 2002, Patent Abstracts of Japan.

Abstract of Japanese Patent Publication No. 11-136568, Pub. Date: May 21, 1999, Patent Abstracts of Japan.

* cited by examiner

| Tag name | Parameter value |
|---|---|
| Light source | clear sky |
| Flash | • auto flash mode<br>• flash on<br>• reflected light sensor present<br>• reflected light sensed |
| Subject distance | 1 (m) |
| Subject area | • center coordinates (640, 512)<br>• width (324)<br>• height (375) |
| Flash intensity | 1000 (BCPS) |
| Aperture value | F8 |
| ISO speed rate | 100 |

•
•
•

BAave: average brightness value within subject area
Bave: average brightness value of entire image
k: predetermined constant BAave: average brightness value within subject area
Bave: average brightness value of entire image
k: predetermined constant BAave: average brightness value within subject area
Bave: average brightness value of entire image
k: predetermined constant BAave: average brightness value within subject area
Bave: average brightness value of entire image
k: predetermined constant BAWave: weighted average brightness value within subject area
Bave: average brightness value of entire image
k: predetermined constant Bratio: proportion of bright pixels (brightness value ≧ YHth)
Bth: bright pixel proportion threshold value
Dratio: proportion of dark pixels (brightness value ≦ YLth)
Dth: dark pixel proportion threshold value Dark
Dark area brightness value Bm: small Darker
Dark area brightness value Bm: smaller Dark
Maximum brightness value
in subject area BAmax: small Darker
Maximum brightness value
in subject area BAmax: smaller

BACKLIGHT ADJUSTMENT PROCESSING OF IMAGE USING IMAGE GENERATION RECORD INFORMATION

BACKGROUND OF THE INVENTION

1. Field of the Invention

The present invention relates to an image data adjusting technique for adjusting image quality of image data.

2. Description of the Related Art

Quality of image data generated by a digital still cameras (DSC) or digital video cameras (DVC) can be adjusted in any desired manner using an image retouching application on a personal computer. Image retouching applications typically have an image adjusting function that automatically adjusts the quality of image data, and quality of image data output from an output device may be improved using this image adjusting function. Known image output devices include, for example, CRTs, LCDs, printers, projectors, and television receivers.

A printer driver for a printer also has a function for automatically adjusting image quality, and quality of printed images can be improved using such a printer driver as well.

Brightness is one important factor determining image quality of image data. If the brightness of image data has been set to the proper brightness level, the user will recognize the high image quality of the image. Image data brightness is strongly affected by the position of the light source when image data is generated. For example, image data is sometimes generated under condition in which the sun or other light source is situated behind a subject (backlighting). Under such backlit conditions, in some instances sufficient light will not fall on the side of an intended subject that is facing the camera, resulting in generation of image data in which the intended is darker than the proper brightness level. Thus, methods that analyze image data brightness and adjust the image data on the basis of the results so as to increase brightness in dark areas and improved image quality are used.

With the automatic image quality adjusting function provided by an image retouching application or printer driver, quality corrections are made on the basis of image data having standard quality characteristics. On the other hand, image data being subjected to image processing can be produced under various conditions. For example, the position of a subject within an image may be set arbitrarily according to user preference, and shooting location. In some instances image data is generated using a flash or other supplemental light source; and shooting takes place under different conditions depending on shooting location, for example, shooting outdoors, and shooting indoors.

For this reason, in some instances image quality of an image overall cannot be improved through quality corrections to an image containing dark areas, made on the basis of image data having standard quality characteristics. This problem is not limited to DSCs, and is a problem common to DVCs and other such image producing devices.

SUMMARY OF THE INVENTION

Accordingly, an object of the present invention to automatically adjust image quality with reference to an individual set of image data.

In order to attain at least part of the above and related object of the present invention, there is provided an output device for outputting an image using image data generated by an image generating device, and image generation record information that is associated with that image data and that includes operation information for that image generating device at the time of image generation. The output device comprises an image processing device and an image output section. The image processing device comprises a judging section, and an image quality adjuster. The judging section uses both the image generation record information and the image data in order to perform a backlight decision as to whether to execute backlight adjustment processing. The image quality adjuster executes backlight adjustment processing to increase brightness value of at least some pixels in the image data when it is decided to execute that backlight adjustment processing. The image output section outputs an image according to the image quality-adjusted image data.

The output device according to the present invention can appropriately make a decision as to whether to execute backlight adjustment processing. based on both image generation record information and image data. Backlight adjustment processing will improve brightness in dark areas having low brightness value.

This invention may be embodied in various ways, for example, an image output method and image output device; an image processing method and image processing device; a computer program for realizing the functions of such a method or device; a storage medium having such a computer program stored thereon; and a data signal embedded in a carrier wave containing such a computer program.

These and other objects, features, aspects, and advantages of the present invention will become more apparent from the following detailed description of the preferred embodiments with the accompanying drawings.

BRIEF DESCRIPTION OF THE DRAWINGS

FIG. 5 illustrates an example of data structure in an Exif data field.

DESCRIPTION OF THE PREFERRED EMBODIMENT

The embodiments of the present invention are described hereinbelow through certain specific preferred embodiments, in the following order.

Figure 1:
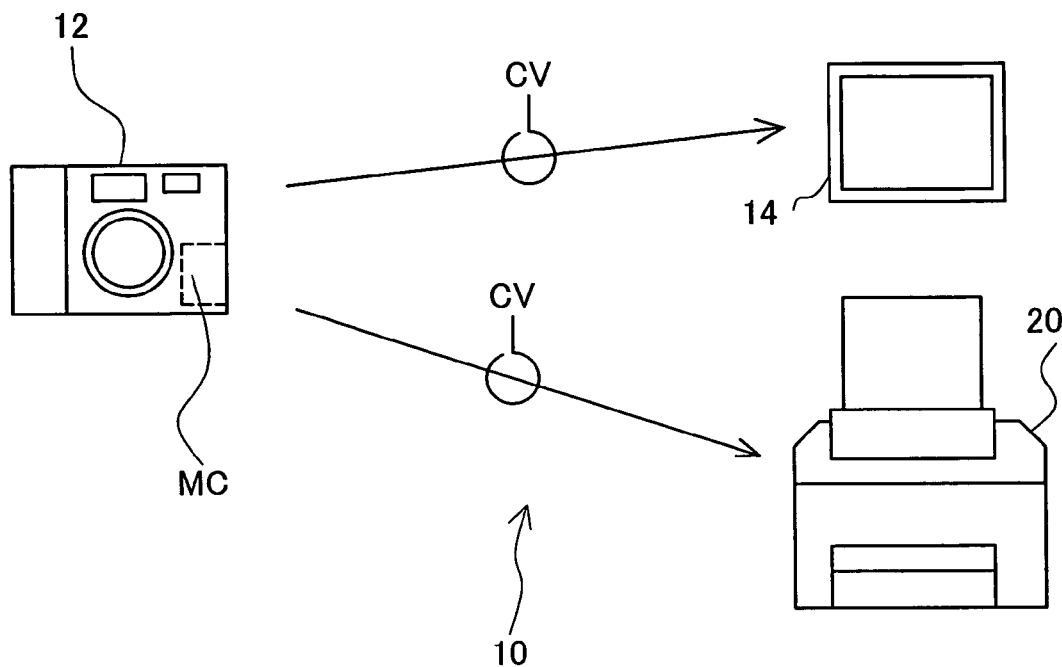
FIG. 1 is a block diagram of arrangement of an image output system as an embodiment of the invention.

A. Arrangement of Image Output System
B. Arrangement of Image File
C. Arrangement of Image Output Device
D. Image Processing in Digital Still Camera
E. Image Processing in Printer
F. Embodiments of Automatic Image quality Adjustment Process
G. Other Embodiments of Backlight Decision Process
H. Other Embodiments of Backlight adjustment processing
I. Arrangement of Image Output System Employing Image Data Processing Device
J. Variant Examples A. Arrangement of Image Output System:

FIG. 1 is an illustration showing an example of an image output system in which may be implemented an output device as an embodiment of the invention. Image output system 10 comprises a digital still camera 12 as an image generating device for generating image files, and a printer 20 as an image output device. Image files generated by digital still camera 12 are transferred to printer 20 via a cable CV, or by directly inserting into printer 20 a memory card MC on which image files are stored. Printer 20 executes image quality adjustment processing of image data based on read out image files, and outputs an image. As the output device, a CRT display, LCD display, or other monitor 14, or a projector could be used in addition to or instead of printer 20. The following description is based on the use of a printer 20 comprising an image quality adjuster and an image output section, with a memory card MC being inserted directly into the printer 20.

Figure 2:
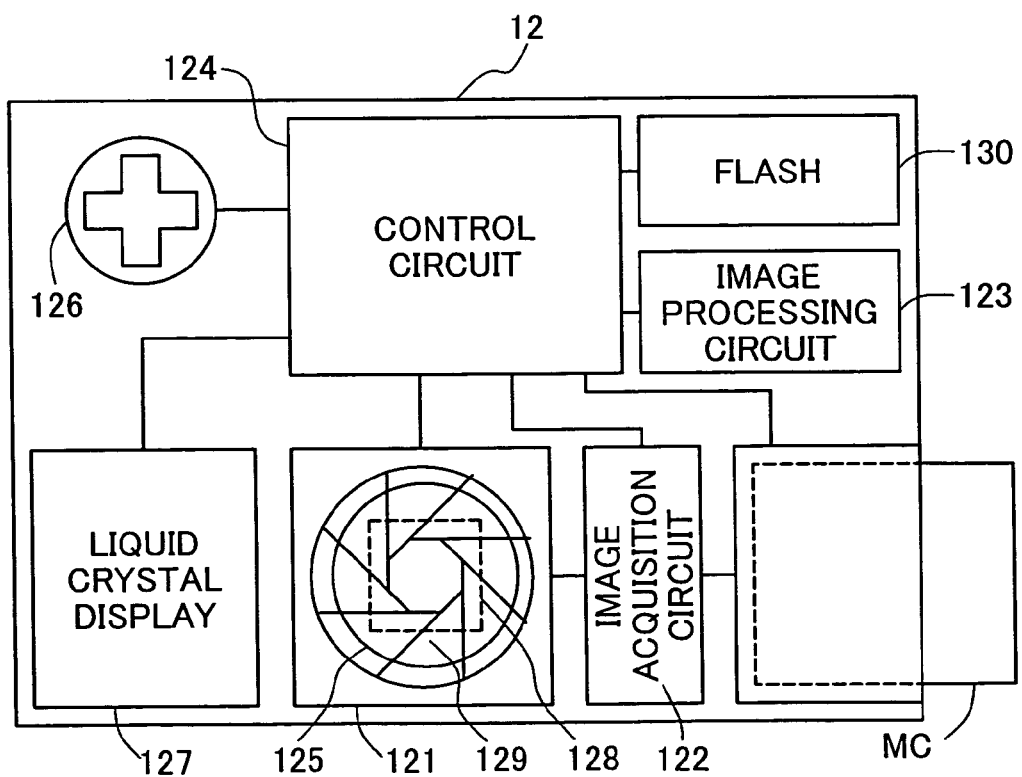
FIG. 2 is a block diagram showing a simplified arrangement of a digital still camera 12.

FIG. 2 is a block diagram showing a simplified arrangement of a digital still camera 12. The digital still camera 12 of this embodiment comprises an optical circuit 121 for collecting optical information; an image acquisition circuit 122 for controlling the optical circuit to acquire an image; an image processing circuit 123 for processing acquired digital images; a flash 130 serving as a supplemental light source; and a control circuit 124 for controlling the various circuits. Control circuit 124 comprises memory, not shown. Optical circuit 121 comprises a lens 125 for collecting optical information; an aperture 129 for adjusting the amount of light; and a CCD 128 for converting optical data passing through the lens into image data.

Digital still camera 12 stores acquired images on a memory card MC. The typical storage format of image data in digital still camera 12 is the JPEG format, but other storage format, such as TIFF format, GIF format, BMP format, or RAW data format, could be used.

Digital still camera 12 further comprises a Select/Set button 126 for setting various shooting parameters, and a liquid crystal display 127. Liquid crystal display 127 is used to preview photographed images, and when setting the aperture or other parameters using the Select/Set button 126.

When a photograph has been taken with a digital still camera 12, image data and image generation record information are stored as an image file in memory card MC. Image generation record information can include aperture value and other parameter settings at the time of shooting (time of generation of image data).

Figure 3:
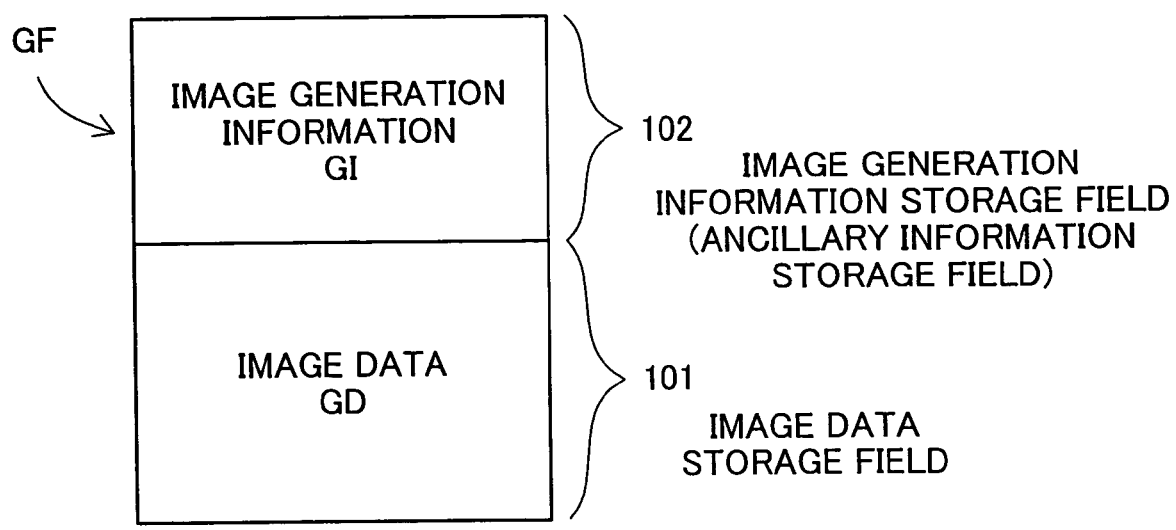
FIG. 3 is a conceptual illustration of an example of an arrangement within an image file.

B. Arrangement of Image File:

FIG. 3 is a conceptual illustration of an example of the structure of an image file that can be used in this embodiment. Image file GF comprises an image data storage field 101 for storing image data GD; and an image generation record information storage field 102 for storing image generation record information GI. Image data GD is stored, for example, in JPEG format, while image generation record information GI is stored, for example, in TIFF format (a format in which data and data fields are specified using tags). The terms file structure and data structure in this embodiment refer to file or data structure in the form in which a file or data etc. is stored in a memory device.

Image generation record information GI is produced at the time when the associated image data is generated or shot by digital still camera 12 or other such image generating device, and includes the following settings.

light source (type of light source)
flash (Flash On/Off)
subject distance
subject distance range
subject area
flash intensity
aperture value
ISO speed rating
shooting mode (scene mode)
maker name
model name
gamma value The image file GF in this embodiment may basically comprise the aforementioned image data storage field 101 and image generation record information storage field 102; or may have a file structure according to an existing standardized file format. The following specific description pertains to the case where the image file GF pertaining to this embodiment conforms to the Exif file format.

An Exif file has a file structure in accordance with the digital still cameran image file format specification (Exif); the specification has been proposed by the Japan Electronics and Information Technology Industries Association (JEITA). Similar to the conceptual diagram in FIG. 3, the Exif file format comprises a JPEG image data storage field for storing image data in the JPEG format; and an ancillary information storage field for storing information of various kinds relating to stored JPEG image data. The JPEG image data storage field corresponds to the image data storage field 101 in FIG. 3, and the ancillary information storage field to the image generation record information storage field 102. The ancillary information storage field stores image generation record information relating to a JPEG image, such as shooting date/time, aperture value, and subject distance.

Figure 4:
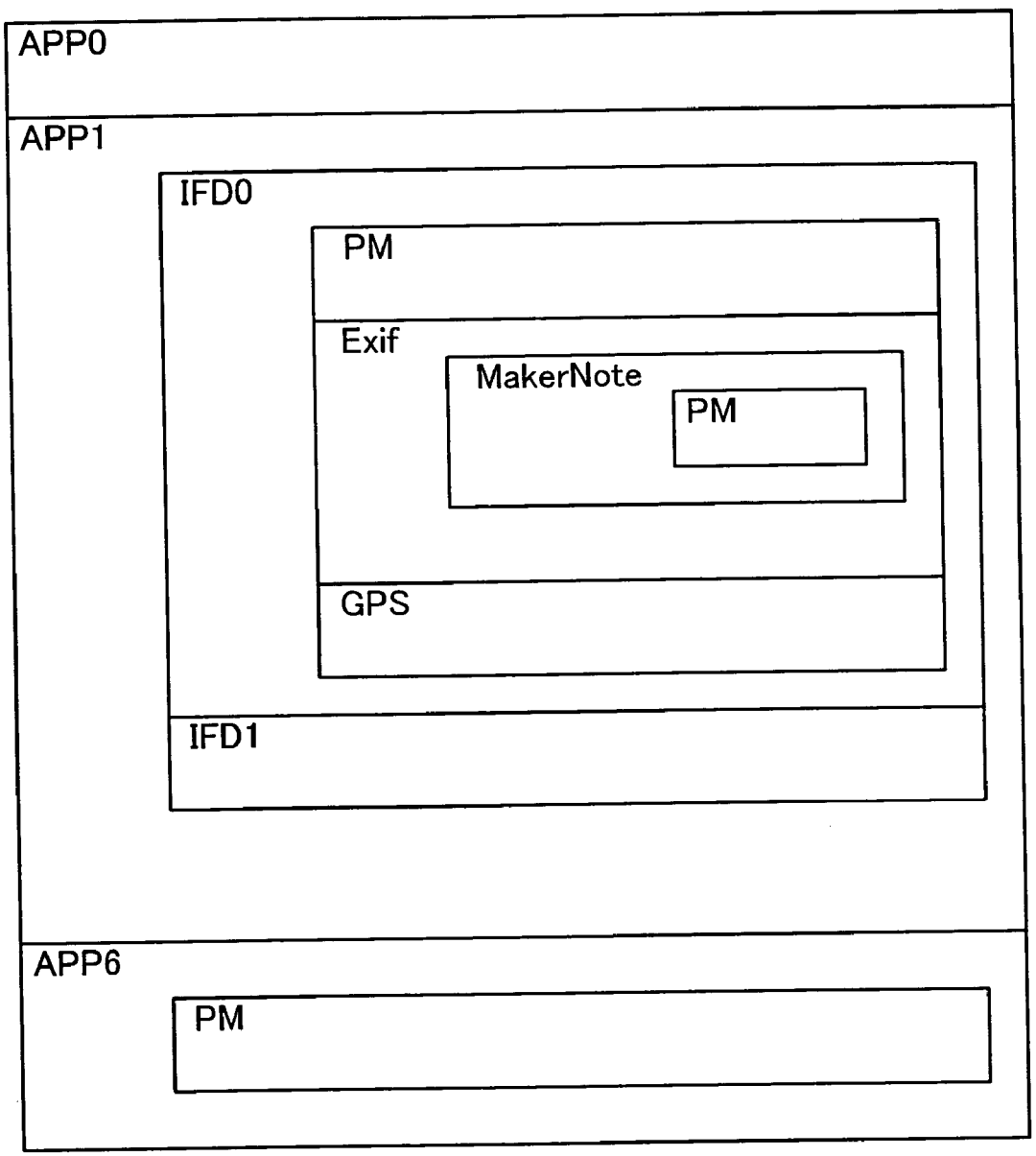
FIG. 4 illustrate an example of data structure of an ancillary information storage field 103.

FIG. 4 illustrates an example of data structure of ancillary information storage field 103. In the Exif file format, hierarchical tags are used to designate data fields. Each data field can contain a plurality of subordinate data fields identified by subordinate tags. In FIG. 4, areas enclosed by rectangles represent single data fields, with tag names noted at upper left. In this embodiment, three data fields whose tag names are APP0, APP1, and APP6 are contained. The APP1 data field contains within it two data fields whose tag names are IFD0 and IFD1. The IFD0 data field contains three data fields whose tag names are PM, Exif, and GPS. Data and data fields are stored according to a prescribed address or offset value; address or offset value can be searched by means of tag name. On the output device, data corresponding to desired information can be acquired by means of specifying and address or offset value corresponding to the desired information.

FIG. 5 illustrates an example of data structure (data tag names and parameter values) in the Exif data field in FIG. 4, wherein tag name can be referenced by tracing in the order APP1-IFD0-Exif. As shown in FIG. 4, the Exif data field can include a data field whose tag name is MakerNote; the MakerNote data field can in turn include a plurality of items of data, although these are omitted in FIG. 5.

As shown in FIG. 5, the Exif data field stores parameter values relating to information such as light source, flash, subject distance, subject area, flash intensity, aperture value, and ISO speed rating. In this embodiment, light source is used as information relating to the location of the subject of the image data, such as indoors or outdoors; flash is used as flash information for a supplemental light source; subject distance is used as information relating to the distance between a subject of image data and the image generating device; and subject area is used as subject position information, respectively.

Light source information indicates the type of light source at the time of generation of image data, and may be selected from among, for example, daylight, clear sky, cloudy, shade, fluorescent, and tungsten. Of these settings, a decision that the subject is situated outdoors may be made when the device is set to daylight, clear sky, cloudy, or shade. A decision that the subject is situated indoors may be made when the device is set to fluorescent or tungsten.

Flash information indicates operation of the flash, and can include four sets of information relating to operating modes and operation result thereof. Operating mode may be set from among a plurality of values including the following three values, for example.
1: forced flash mode
2: flash off mode
3: auto flash mode Operation result may be set from among two values, Flash on or Flash off, for example. The decision as to whether or not there was illumination by the supplemental light source during generation of image data may be carried out using this operation result.

Certain image generating devices are equipped with a mechanism for sensing reflected light from a subject illuminated with light from a flash. In the event that a flash cover or other obstacle blocks the flash light, or the flash does not fire despite being operated, no light illuminates the subject. Such instances can be identified through the presence or absence of reflected light. Flash information can include information relating to the presence/absence of a reflected light sensing mechanism, and to the presence/absence of reflected light sensed at the time the image data is generated (or time of shooting). In the event that a reflected light sensing mechanism is present but sensed reflected light is absent, it can be decided that there is no illumination by the supplemental light source, even if the aforementioned operation result is Flash on.

In the event that an image generating device is not equipped with a flash, the flash information may be set to "Flash off". Where set to "Flash off", it can be decided that there has been no illumination by a supplemental light source.

Subject distance information indicates the distance between the image generating device and a subject at the time of generation of image data. For example, it can be set in meter units, based on distance information set to match the focal point at the time that image data is generated.

Subject area information indicates the position of a subject in an image, and center coordinates in the image are set as the parameter value. Where a circular or rectangular area is set to indicate the size of the subject, the radius of the circle or width of the rectangle can be set in association therewith.

Flash intensity information indicates the quantity of light emitted by the flash at the time that image data is generated; the unit of measurement thereof is BCPS (Beam Candle Power Seconds), for example.

Aperture value is of the value at the time that image data is generated; F number is used as the parameter value. Thus, a larger aperture value means a smaller aperture.

ISO speed rating information indicates the sensitivity of the optical circuit at the time that image data is generated, and is set to a parameter value equivalent to ISO speed which is an index of sensitivity of silver salt film. ISO speed is used in combination with other parameters relating to image generation, such as aperture value, to set appropriate image generating parameters or shooting parameters. In an image generating device such as a digital still camera, by using the corresponding ISO speed as an indicator of the sensitivity of the optical circuit, image generating parameters such as aperture value can be set easily.

The above information is all operating information for the image generating device. Operating information may be set by the user in association with generation of image data, or set automatically by the image generating device. Certain image generating devices permit the user to set a shooting mode or a scene mode, with the image generating device then automatically setting related parameters (aperture value, ISO speed etc.) with reference to the selected shooting mode. Shooting mode can be selected from among a number of predetermined modes, for example, standard mode, portrait mode, landscape mode, and night scene mode. Where standard mode has been selected as the shooting mode, parameters relating to image generation are set to standard values.

Information associated with image data is also stored appropriately in fields other than the Exif data field in FIG. 4. For example, maker name and model name are stored in the data field whose tag name is IFD0, as information identifying the image generating device.

Figure 6:
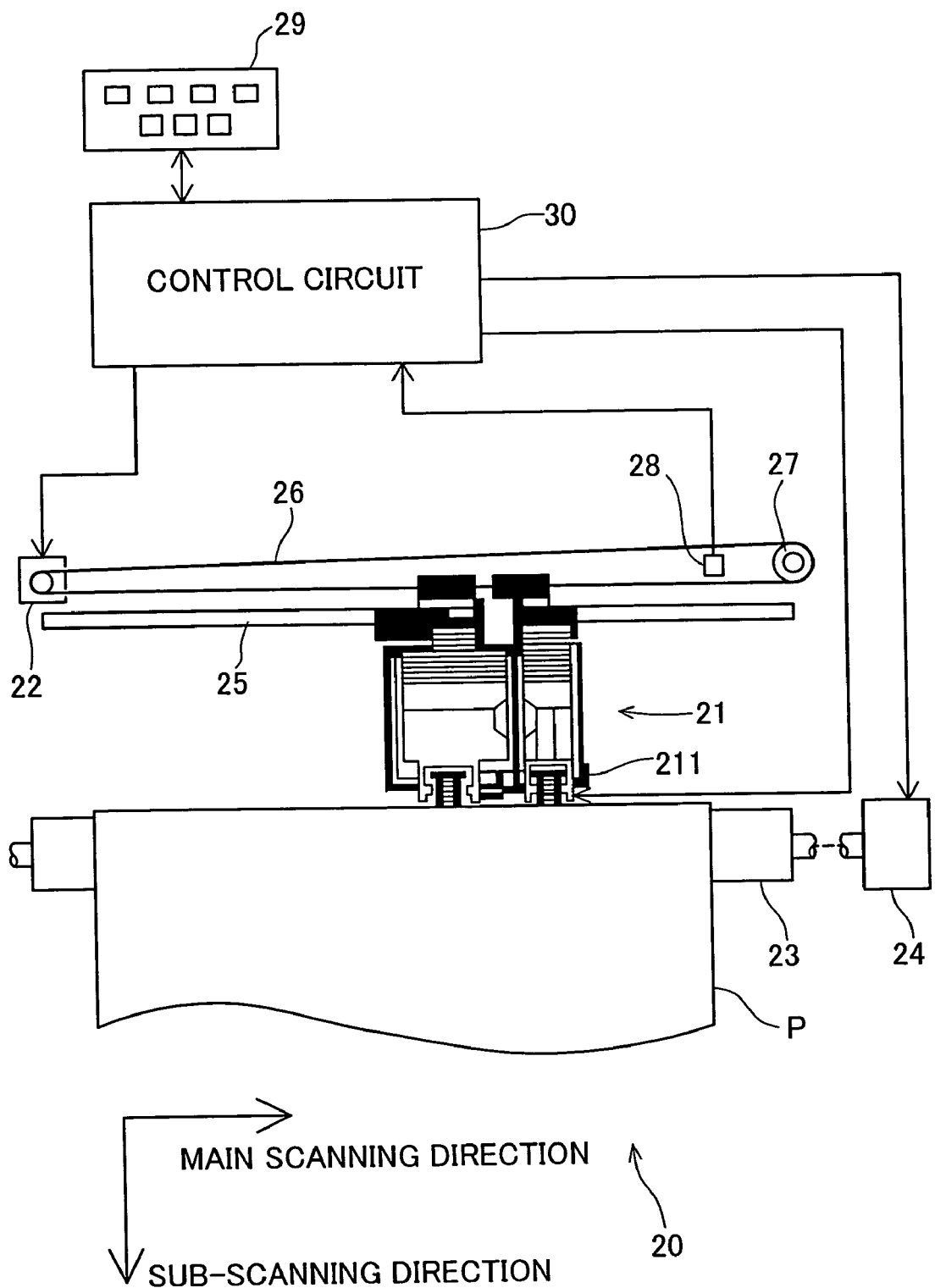
FIG. 6 is a block diagram showing a simplified arrangement of a printer 20.

C. Arrangement of Image Output Device:

FIG. 6 is a block diagram showing a simplified arrangement of printer 20 in the present embodiment. Printer 20 is a printer capable of image output, for example, an ink jet printer that ejects ink of four colors, cyan C, magenta M, yellow Y, and black K, on a print medium to reproduce an image. An electrophotographic printer that transfers and fixes toner onto a print medium may also be used. In addition to the four colors indicated above, light cyan LC which is lighter in density than cyan C, light magenta LM which is lighter in density than magenta M, dark yellow DY which is darker in density than yellow Y may be used as ink. Where monochromatic printing is performed, the arrangement may employ black K only; or red R or green G may be used. The type of ink or toner used can be selected depending on the characteristics of the image for output.

As shown in the drawing, printer 20 comprises a mechanism for driving a print head 211 mounted on a carriage 21, to eject ink and form dots; a mechanism for reciprocating carriage 21 in the axial direction of a platen 23 by means of a carriage motor 22; a mechanism for feeding printer paper P by means of a paper feed motor 24; and a control circuit 30. By means of these mechanisms, printer 20 functions as an image output section. The mechanism for reciprocating carriage 21 in the axial direction of platen 23 is composed of a slide rail 25 extending parallel to the axis of platen 23, for slidably retaining carriage 21; a pulley 27 coupled via an endless drive belt 26 to a carriage motor 22; and a position sensor 28 for sensing the home position of carriage 21. The mechanism for feeding printer paper P is composed of platen 23; paper feed motor 24 which rotates platen 23; an auxiliary paper feed roller, not shown in the drawing; and a gear train (not shown) for transmitting rotation of paper feed motor 24 to platen 23 and the auxiliary paper feed roller.

Control circuit 30 exchanges signals with a printer control panel 29 while appropriately controlling operation of paper feed motor 24, carriage motor 22, and print head 211. Printer paper P supplied to printer 20 is set pinched between platen 23 and the auxiliary paper feed roller, and advanced by a predetermined amount depending on the rotation angle of platen 23.

Carriage 21 has a print head 211, and is designed for installation of an ink jet cartridge of utilizable ink. On the bottom face of print head 211 are disposed nozzles for ejecting utilizable ink (not shown).

Figure 7:
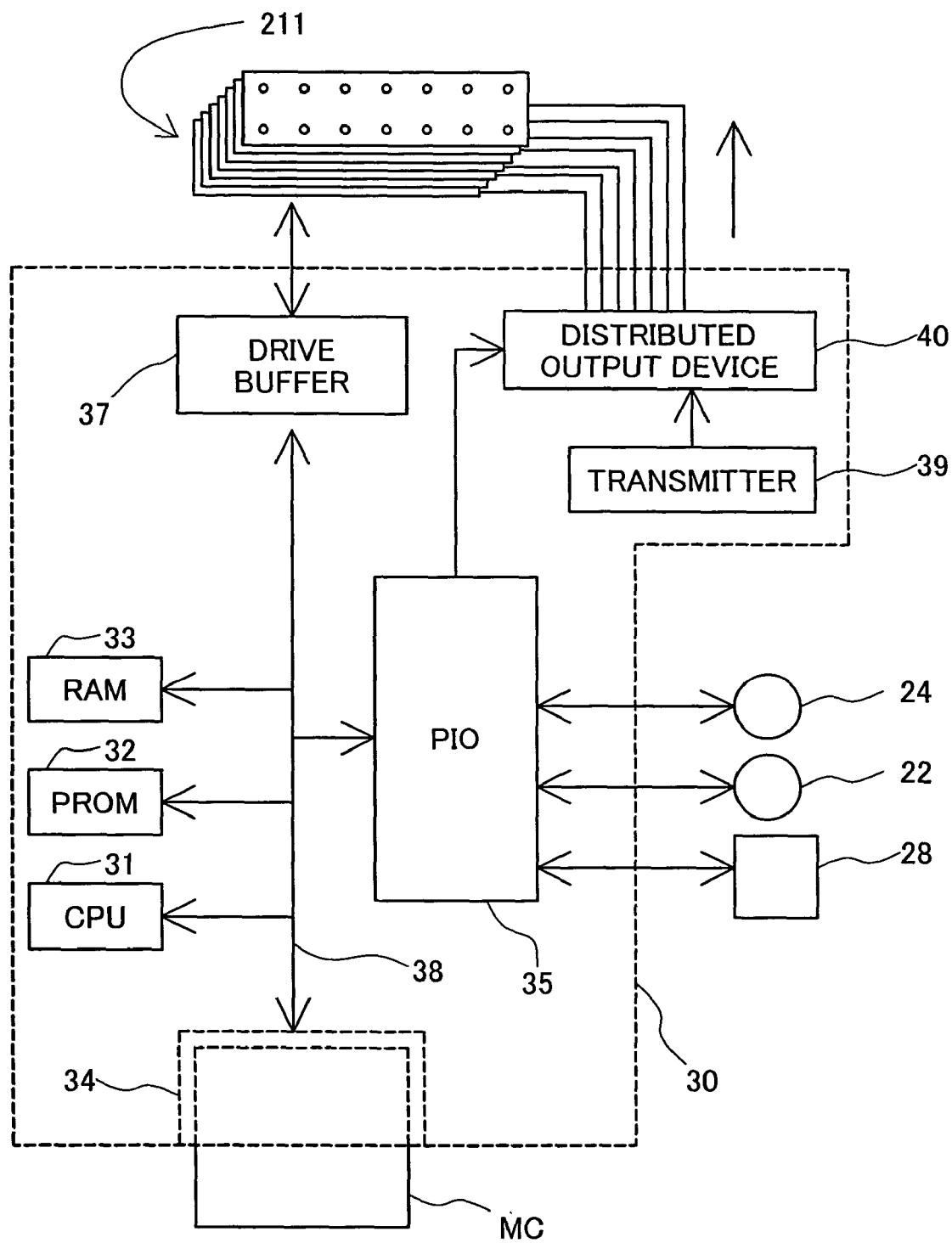
FIG. 7 is a block diagram showing the arrangement of printer 20.

FIG. 7 is a block diagram showing an arrangement of printer 20, centered on the control circuit 30 of printer 20. Within control circuit 30 are disposed a CPU 31, PROM 32, RAM 33, a memory card slot 34 for acquiring data from a memory card MC, a peripheral device input/output section (PIO) 35 for exchanging data with paper feed motor 24, carriage motor 22, and a drive buffer 37. Drive buffer 37 is used as a buffer for supplying dot on/off signals to print head 211. These components are interconnected by a bus 38, enabling exchange of data among them. Control circuit 30 is also provided with a transmitter 39 for outputting a drive waveform at predetermined frequency, and a distributed output device 40 for distributing the output of transmitter 39 to print head 211 at predetermined timing.

Control circuit 30, while synchronizing with operation of paper feed motor 24 and carriage motor 22, outputs the dot data to drive buffer 37 at predetermined timing. Control circuit 30 also reads out an image file from memory card MC, analyzes the ancillary information, and performs image processing based on the resultant image generation record information. That is, control circuit 30 functions as a judging section and image quality adjuster. The flow of image processing executed by control circuit 30 is described later in detail.

Figure 8:
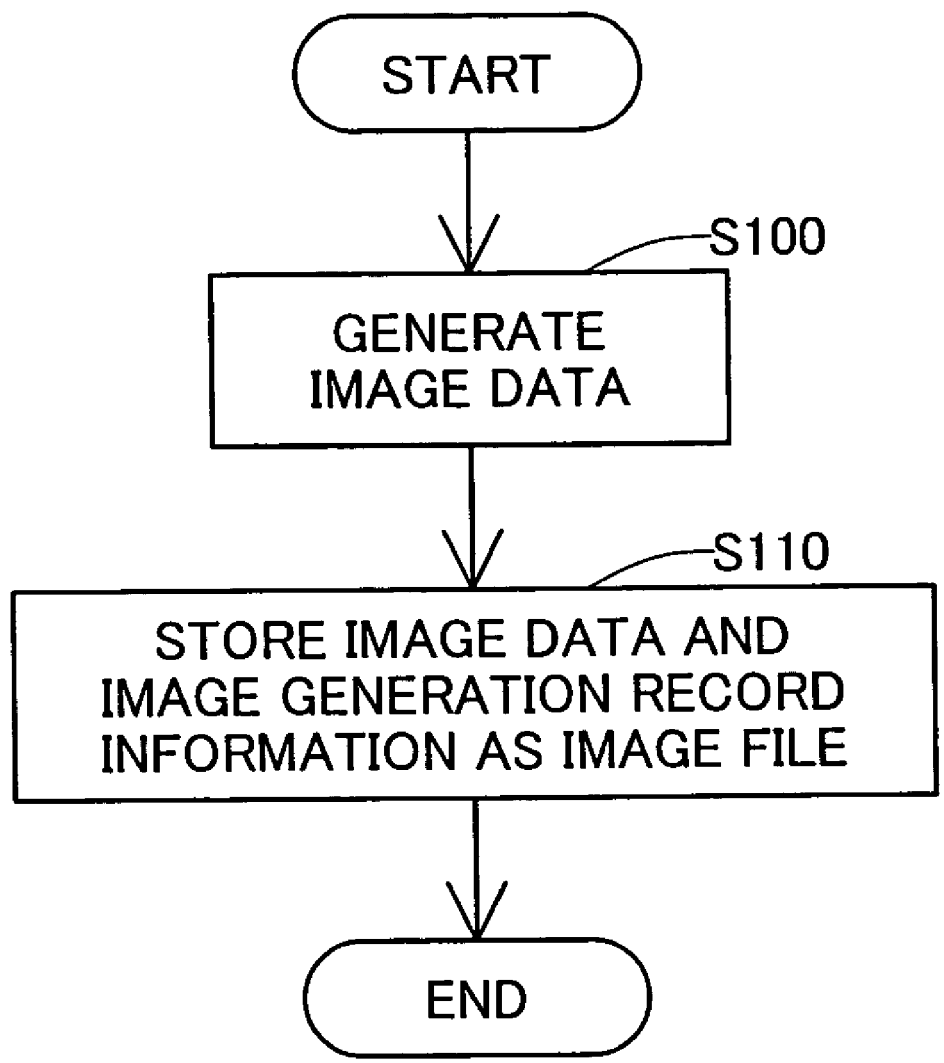
FIG. 8 is a flowchart showing flow of an image file GF generation process.

D. Image Processing in Digital Still Camera:

FIG. 8 is a flowchart showing a process flow for generating an image file GF in digital still camera 12.

Control circuit 124 (FIG. 2) of digital still camera 12 generates image data GD in response to a shoot request, for example, depression of a shutter button (Step S100). Where aperture value, ISO speed, shooting mode and other parameter settings have been made, image data GD is generated using the set parameter values.

Control circuit 124 stores the generated image data GD and image generation record information GI as an image file GF on memory card MC (Step S110), and terminates the processing routine. Image generation record information GI includes parameters used at the time of image generation, such as aperture value, ISO speed, shooting mode and/or other arbitrarily set parameter values, and parameter values set automatically, such as maker name, and model name. Image data GD is stored in an image file GF after being converted from an RGB color space to a YCbCr color space, and compressed in JPEG format.

By means of the aforementioned processes executed in digital still camera 12, image generation record information GI that includes various parameter values at the time of generation of image data is set in the image file GF stored on memory card MC, together with the image data GD.

Figure 9:
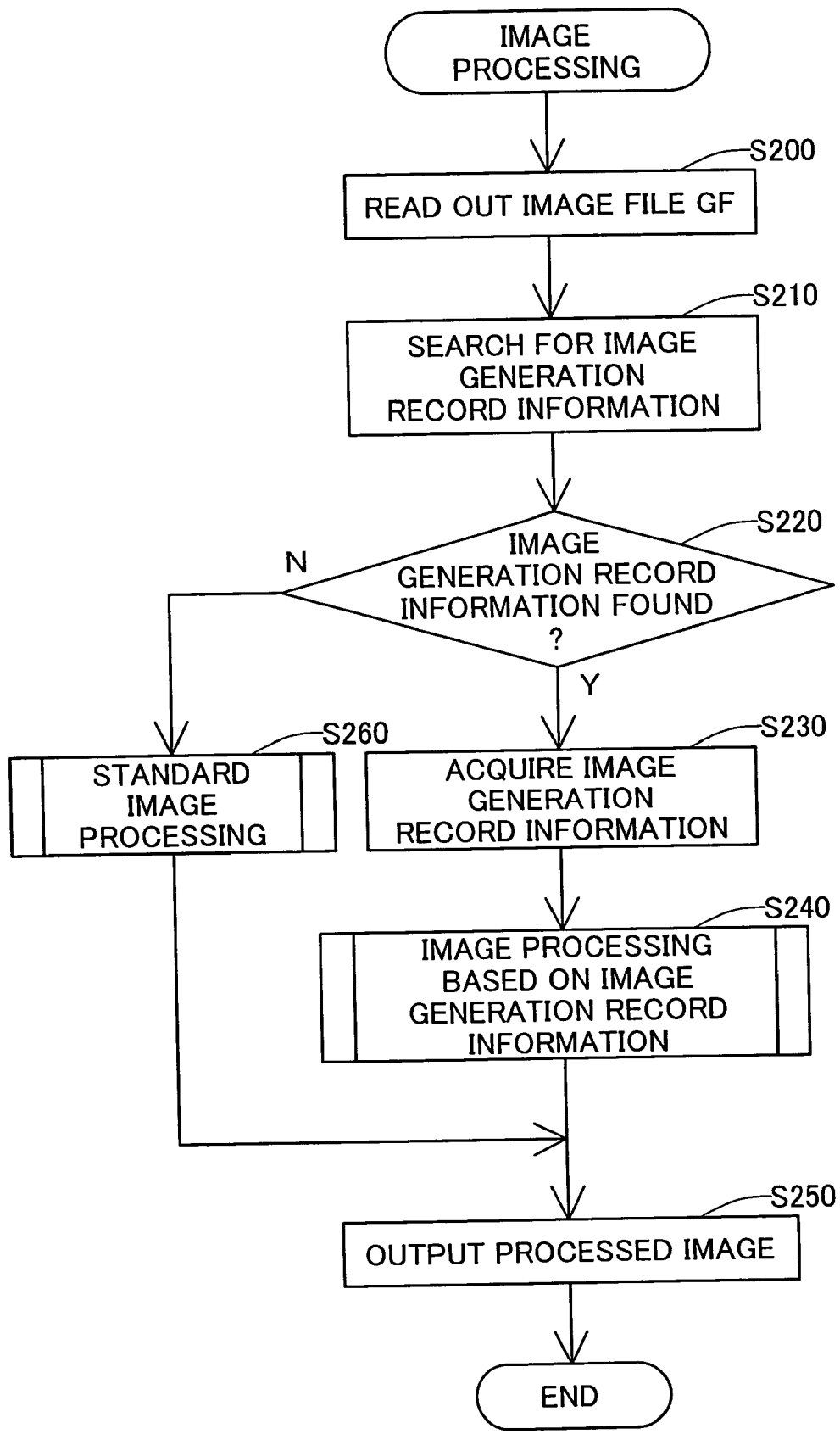
FIG. 9 is a flow chart showing a processing routine for image processing.

E. Image Processing in Printer:

FIG. 9 is a flowchart showing a processing routine for image processing in printer 20 of the present embodiment. In the following description, it is assumed that a memory card MC having an image file GF stored thereon is inserted directly into printer 20. When memory card MC has been inserted into memory card slot 34, the CPU 31 of control circuit 30 (FIG. 7) of printer 20 reads out the image file GF from memory card MC (Step S200). Next, in Step S210, CPU 31 searches in the ancillary information storage field of image file GF for image generation record information GI indicating information at the time that the image data was generated. In the event that image generation record information GI is found (Step S220: Y), CPU 31 acquires and analyzes the image generation record information GI (Step S230). On the basis of the analyzed image generation record information GI, CPU 31 executes image processing, described later (Step S240), outputs the processed image (Step S250), and terminates the processing routine.

An image file created by a drawing application, on the other hand, will not contain image generation record information GI having information such as aperture value and the like. If CPU 31 cannot find image generation record information GI (Step S200: N), it performs standard processing (Step S260), outputs the processed image (Step S250), and terminates the processing routine.

Figure 10:
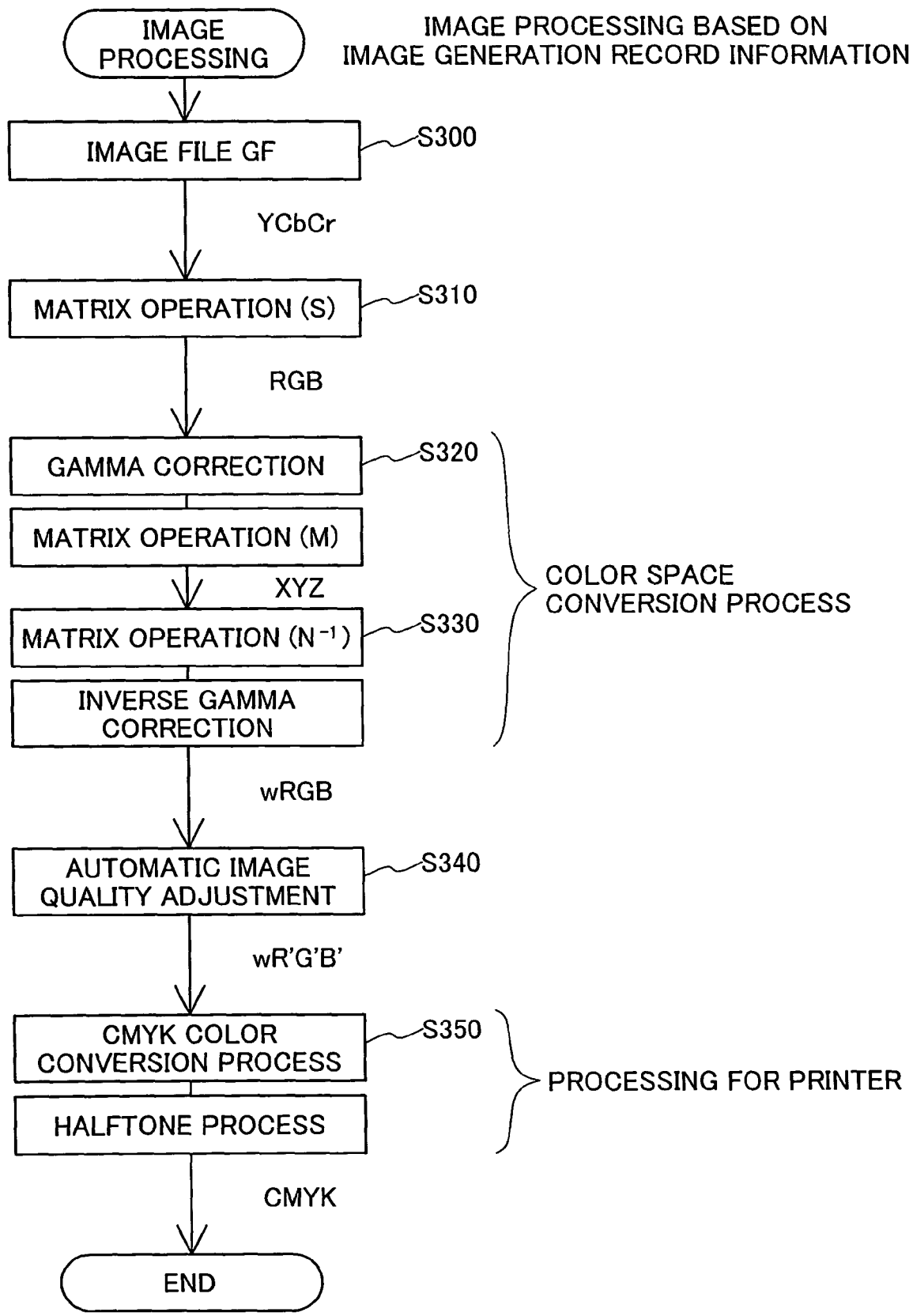
FIG. 10 is a flow chart showing a processing routine for image processing.

FIG. 10 is a flowchart showing a processing routine for image processing (corresponding to Step S240 in FIG. 9) based on image generation record information. The CPU 31 of control circuit 30 (FIG. 7) of printer 20 reads out image data GD from the read out image file GF (Step S300)

As mentioned previously, digital still camera 12 stores image data GD as JPEG format files, and in a JPEG format file image data is stored using an YCbCr color space. In Step S310, CPU 31 executes an operation using 3×3 matrix S to convert image data based on an YCbCr color space into image data based on an RGB color space. This matrix operation is represented by the following arithmetic expression, for example.

$$\begin{pmatrix} R \\ G \\ B \end{pmatrix} = S \begin{pmatrix} Y \\ Cb - 128 \\ Cr - 128 \end{pmatrix} \quad [\text{Eq.1}]$$

$$S = \begin{pmatrix} 1 & 0 & 1,40200 \\ 1 & -0.34414 & -0.71414 \\ 1 & 1.77200 & 0 \end{pmatrix}$$

Where the color space of image data generated by digital still camera 12 is wider than a predetermined color space, for example, the sRGB color space, image data based on the RGB color space obtained in Step S310 may in some instances contain valid data that is outside the defined area of the RGB color space. Where image generation record information GI instructs this out-of-defined area data to be handled as valid data, the out-of-defined area data will be kept, and subsequent image processing continues. In the absence of an instruction to handle out-of-defined area data as valid data, out-of-defined area data is clipped to the defined area. For example, where the defined area is 0-255, negative value data of less than 0 is rounded to 0, and data above 255 to 255. In the event that the color space that can be represented by the image output section is not wider than a predetermined color space, for example, the sRGB color space, it is preferable to clip to the defined area, regardless of any instruction in the image generation record information GI. Such instances would include, for example, cases where image is output to a CRT, whose available color space is the sRGB color space.

Next, in Step S320, CPU 31 performs gamma correction and an operation employing a matrix M, to convert image data based on an RGB color space to image data based on an XYZ color space. Image file GF can contain gamma value and color space information at the time of image generation. In the event that image generation record information GI includes this information, CPU 31 acquires the gamma value of the image data from the image generation record information GI, and executes a gamma conversion process of the image data using the acquired gamma value. CPU 31 then acquires color space information for the image data from the image generation record information GI, and executes a matrix operation on the image data using a matrix M that corresponds to the color space. In the event that image generation record information GI does not contain a gamma value, a gamma conversion process can be executed using a standard gamma value. A gamma value and matrix for the sRGB color space may be used respectively as this standard gamma value and matrix M. The matrix operation may be given by the following arithmetic expression, for example.

$$\begin{pmatrix} X \\ Y \\ Z \end{pmatrix} = M \begin{pmatrix} Rt' \\ Gt' \\ Bt' \end{pmatrix} \quad [\text{Eq. 2}]$$

$$M = \begin{pmatrix} 0.6067 & 0.1736 & 0.2001 \\ 0.2988 & 0.5868 & 0.1144 \\ 0 & 0.0661 & 1.1150 \end{pmatrix}$$

$$Rt, Gt, Bt \geq 0$$

$$Rt' = \left(\frac{Rt}{255}\right)^y \quad Gt' = \left(\frac{Gt}{255}\right)^y \quad Bt' = \left(\frac{Bt}{255}\right)^y$$

$$Rt, Gt, Bt < 0$$

$$Rt' = -\left(\frac{-Rt}{255}\right)^y \quad Gt' = -\left(\frac{-Gt}{255}\right)^y \quad Bt' = -\left(\frac{-Bt}{255}\right)^y$$

The color space of image data obtained after the matrix operation has been executed is an XYZ color space. The XYZ color space is an absolute color space, and is a device-independent color space not dependent on a device such as a digital still camera or printer. Thus, device-independent color matching can be carried out by means of color space conversion through the XYZ color space.

Next, in Step S330, CPU 31 performs an operation employing a matrix $N^{-1}$, and executes inverse gamma correction to convert image data based on the XYZ color space to image data based on the wRGB color space. During inverse gamma correction, CPU 31 acquires a printer-side gamma value from PROM 32, and executes inverse gamma correction of the image data using the inverse of the acquired gamma value. CPU 31 then acquires from PROM 32 a matrix $N^{-1}$ that corresponds to the conversion from the XYZ color space to the wRGB color space, and performs a matrix operation on the image data using this matrix $N^{-1}$. This matrix operation may be given by the following arithmetic expression, for example.

$$\begin{pmatrix} Rw \\ Gw \\ Bw \end{pmatrix} = N^{-1} \begin{pmatrix} X \\ Y \\ Z \end{pmatrix} \quad [\text{Eq. 3}]$$

$$N^{-1} = \begin{pmatrix} 3.30572 & -1.77561 & 0.73649 \\ -1.04911 & 2.1694 & -1.4797 \\ 0.06568289 & -0.241078 & 1.24898 \end{pmatrix}$$

$$Rw' = \left(\frac{Rw}{255}\right)^{1/y} \quad Gw' = \left(\frac{Gw}{255}\right)^{1/y} \quad Bw' = \left(\frac{Bw}{255}\right)^{1/y}$$

Next, in Step S340, CPU 31 executes automatic adjustment processing of image quality. Automatic image quality adjustment processing in this embodiment involves the use of image generation record information contained in the image file GF. Automatic image quality adjustment processing is described later.

Next, in Step S350, CPU 31 executes a CMYK color conversion process and a halftone process for the purpose of printing. In the CMYK color conversion process, CPU 31 refers to a look-up table (LUT), stored in PROM 32, for conversion from the wRGB color space to the CMYK color space, and converts the color space of the image data from the wRGB color space to the CMYK color space. That is, image data consisting of RGB multi level values is converted to image data for use by printer 20, consisting, for example, of multi level values for six colors, C (Cyan), M (Magenta), Y (Yellow), K (Black), LC (Light Cyan), and LM (Light Magenta).

CPU 31 executes a halftone process to produce halftone image data from the color-converted image data. This halftone image data is sequenced in the order of transmission to drive buffer 37 (FIG. 7) to produce the final print data, whereupon the processing routine terminates. Image data processed by means of this processing routine is output in Step S250 of the image processing routine shown in FIG. 9.

Figure 11:
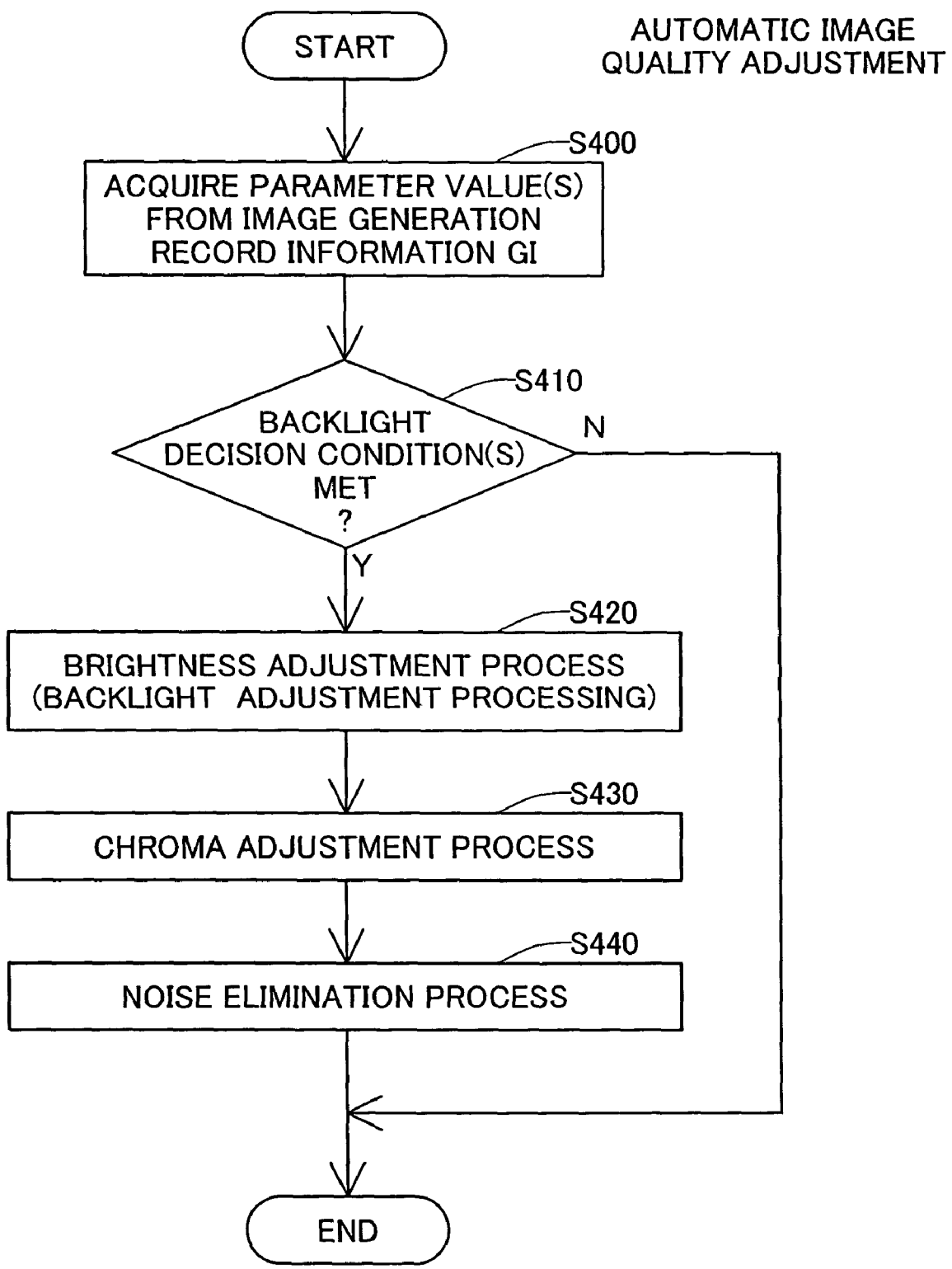
FIG. 11 is a flow chart showing a processing routine for image quality adjustment processing.

F. Embodiment of Automatic Image Quality Adjustment Process:

FIG. 11 is a flowchart showing a processing routine for automatic image quality adjustment processing (corresponding to Step S340 in FIG. 10) in this embodiment. CPU 31 (FIG. 7) analyzes the image generation record information GI and acquires parameter values for flash information etc. (Step S400). Next, in Step S410, CPU 31, based on the acquired parameter values, makes a backlight decision as to whether to execute backlight adjustment processing. If it is determined that there is backlighting, i.e., it is decided to execute backlight adjustment processing (Step S410: Y), in Step S420, CPU 31 executes a brightness adjustment process to increase brightness value.

After executing the brightness adjustment process, in Step S430, CPU 31 executes a chroma adjustment process to increase chroma or saturation. In areas of low brightness value, there is a strong tendency for chroma to be low. Thus, if only brightness value is increased by means of a brightness adjustment process, formerly dark areas may become whitish areas of high brightness value but low chroma. The chroma adjustment process will attain more vivid images.

After executing the chroma adjustment process, in Step S440, CPU 31 executes a noise elimination process. Noise, which does not stand out when brightness value is low, may in some instances stand out when brightness value is increased. In this embodiment, a noise elimination process is executed in order to prevent noise from standing out. The noise elimination process may use various filters including a median filter, and an unsharp mask.

The process flow shown in FIGS. 9-11 is applicable to other embodiments described later.

Figure 12A:
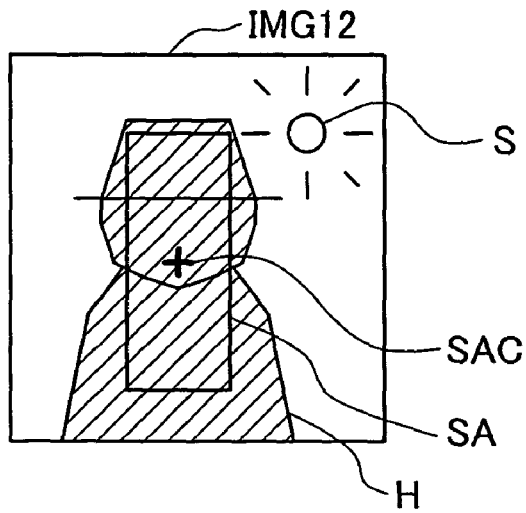
FIGS. 12(a) and 12(b) illustrate the first embodiment of a backlight decision process.
Figure 12B:
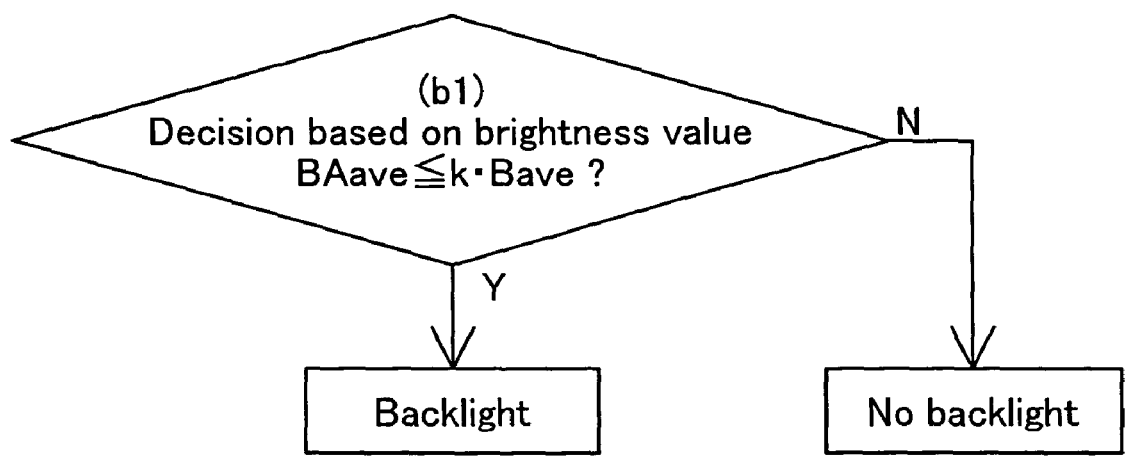

F1. Embodiment 1 of Backlight Decision Process:

FIGS. 12(a) and 12(b) illustrate the backlight decision process in this embodiment. IMG12 in FIG. 12(a) shows an image under backlit conditions. In image IMG12, a human figure H is the subject, with the sun S located in the background. Since the light source, namely, the sun S is situated behind the human figure H, human figure H appears dark. Within image IMG12 is established a subject area center SAC and a subject area SA; the information for SAC and SA is included in the image generation record information. Human figure H is located at the subject area center SAC. Subject area SA is set to match the size of human figure H. In this example, subject area SA is rectangular.

FIG. 12(b) shows the backlight decision process of this embodiment. In this embodiment, it is judged that backlighting is present when the following condition is met.

Condition (b1): Average brightness value BAave in the subject area is equal to or less than a value obtained by multiplying an average brightness value for the entire image by a coefficient k.

Specifically, it is judged that backlighting is present when brightness of a subject area is lower than overall image brightness. The value of the coefficient k may be determined on the basis of sensory test of image output results. For example, a value of 0.6 may be used as a predetermined coefficient k. The decision concerning Condition (b1) is executed using both subject area information and image data GD. By executing decisions based on subject area information in this way, an image in which a subject having a desired location and size is dark may be selected appropriately as a target for backlight adjustment processing. It should be noted that in this decision process the image data GD is analyzed while assigning zero weighting to the area outside the subject area. In other words, the image data GD is analyzed using a weight distribution of different magnitude in the subject location than in the area outside the subject area.

Figure 13A:
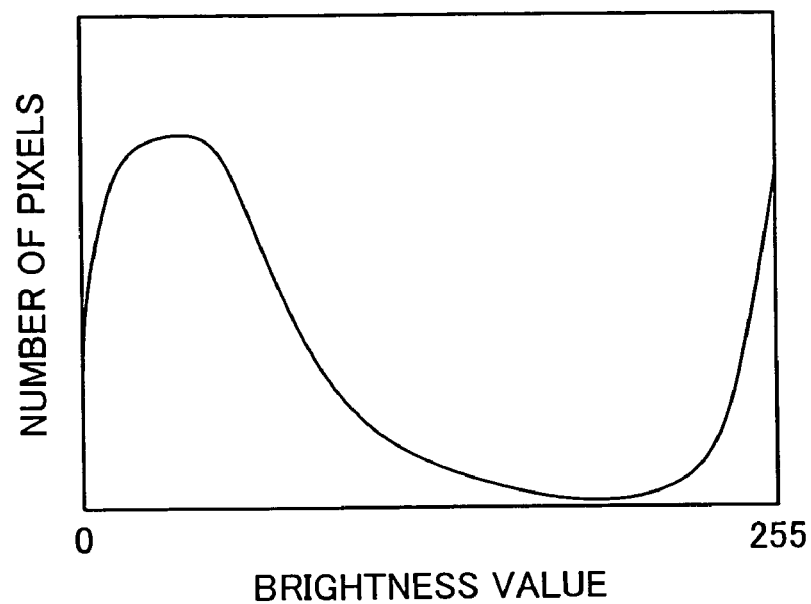
FIGS. 13(a) and 13(b) illustrate the first embodiment of backlight adjustment processing.
Figure 13B:
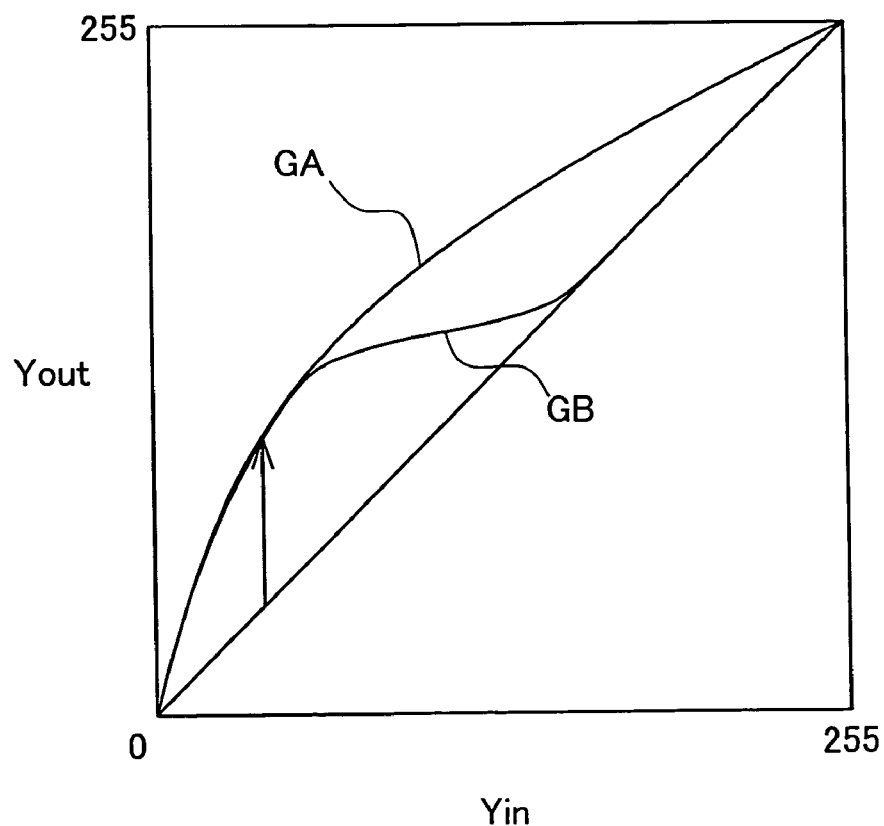

F2. Embodiment 1 of Backlight Adjustment Processing:

FIGS. 13(a) and 13(b) illustrate backlight adjustment processing in this embodiment. FIG. 13(a) shows an example of a brightness value distribution in a backlit image. In a backlit image, both bright areas and dark areas are present. Thus, there are large numbers of pixels having high brightness value and pixels having low brightness value. Particularly where the subject is dark due to backlighting, as in FIG. 12(a), the number of pixels having low brightness value is substantially large.

FIG. 13(b) shows the relationship of brightness value input level Yin to brightness value output level Yout in backlight adjustment processing (or brightness adjustment processing) of this embodiment. Graph GA is arranged so that output level Yout is greater than input level Yin. In particular, the design is such that the increase thereof is greater in areas of low input level Yin. Where brightness values are adjusted using this graph GA, brightness can be improved in dark areas. Values for increase in brightness value may be predetermined based on sensory test of image output results.

Graph GB, in contrast to graph GA, raises brightness values only in areas of low input level Yin. By adjusting brightness values only in darker areas in this way, brightness can be improved in dark areas without changing brightness levels in brighter areas. The range of input levels targeted for adjustment may be determined based on sensory test of image output results. For example, where the range of possible brightness values is 0-255, a target range of 180 or less may be set for brightness value adjustment.

Figure 14A:
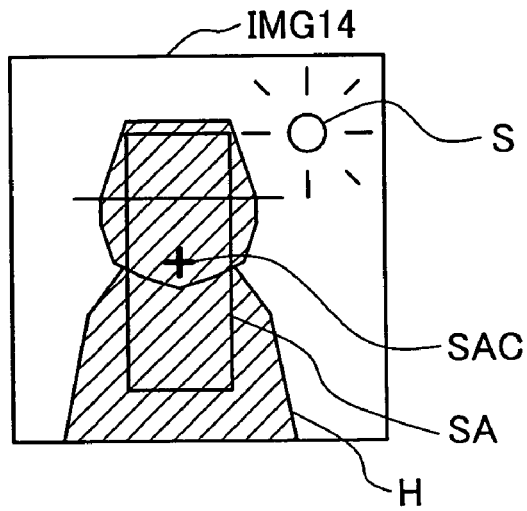
FIGS. 14(a) and 14(b) illustrate in the second embodiment of a backlight decision process.
Figure 14B:
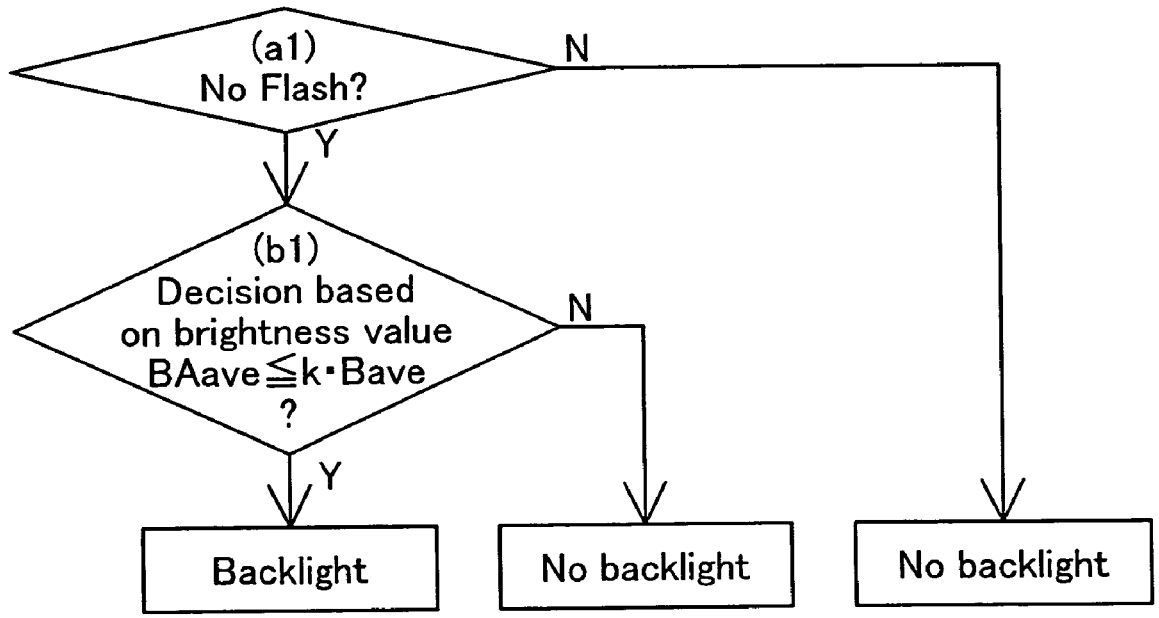

G. Other Embodiments of Backlight Decision Process:

G1. Embodiment 2 of Backlight Decision Process:

FIGS. 14(a) and 14(b) illustrate the backlight decision process in this embodiment. IMG14 in FIG. 14(a) is the same as IMG12 in FIG. 12(a). In this embodiment, it is judged that backlighting is present when the following two conditions are met.

Condition (a1): There was no illumination from a supplemental light source when the image data was generated.

Condition (b1): Average brightness value BAave in the subject area is equal to or less than a value obtained by multiplying an average brightness value for the entire image by a coefficient k.

Condition (b1) is the same as that in Embodiment 1. Decisions as to condition (a1) are made on the basis of the parameter value for flash information included in image generation record information GI. In order to improve brightness of a selected subject when image data is generated under backlit conditions, illumination from a supplemental light source, such as a flash, is sometimes used. It is preferable that no backlight adjustment processing is performed where illumination has been provided by a supplemental light source. In this embodiment, if flash information includes an operation result of Flash off, condition (a) is determined to have been met. Also, if a reflected light sensing mechanism is present but reflected light was not detected, as described hereinabove, condition (a) is determined to have been met even if the flash operation result is Flash on. Condition (a) is also determined to have been met when the parameter value for flash information has been set to "No flash function". When condition (a1) is met in this way, that is, where illumination has not been provided by a supplemental light source, the decision is executed based on condition (b1) just as in Embodiment 1 described previously; and where backlighting is decided to be present, backlight adjustment processing is performed. If, on the other hand, condition (a1) is not met, that is, illumination has been provided by a supplemental light source, it is judged that no backlighting is present, and backlight adjustment processing is not performed. By making the decision based on flash information in this manner, images in which illumination has been provided by a supplemental light source may be excluded from backlight adjustment processing. Additionally, by making a decision with condition (a1) using only flash information and condition (b1) using both subject area information and image data GD, images in which the intended subject is dark may be selected more appropriately as targets for backlight adjustment processing.

Figure 15A:
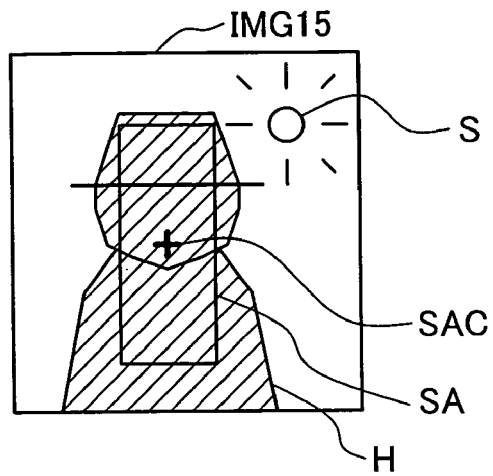
FIGS. 15(a) and 15(b) illustrate the third embodiment of a backlight decision process.
Figure 15B:
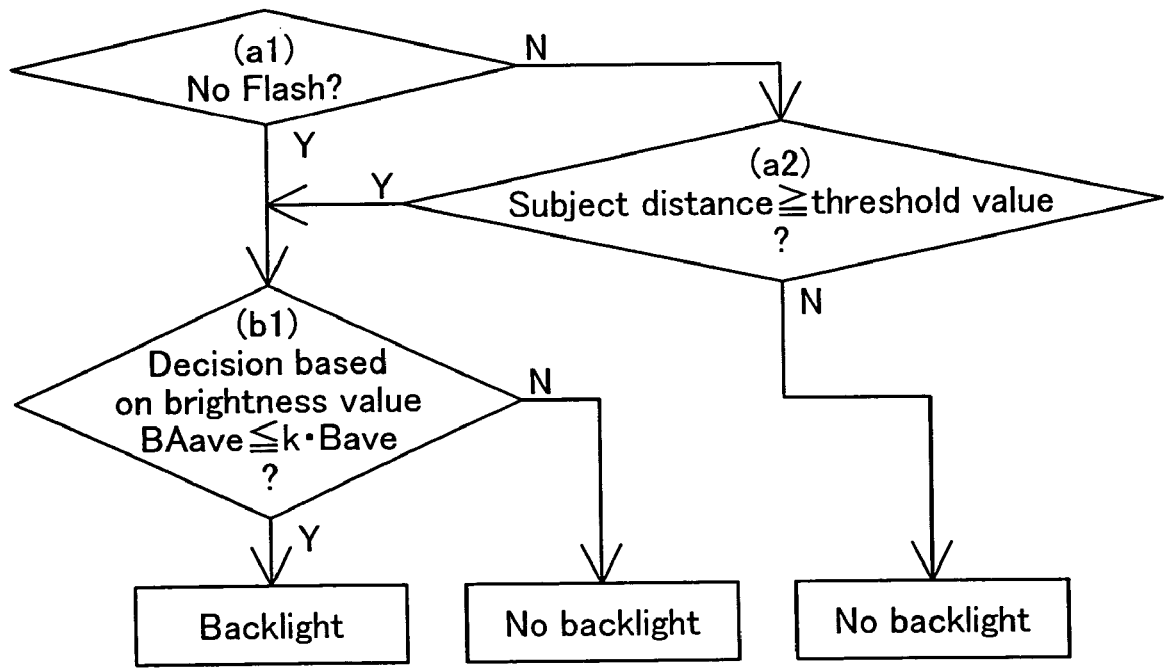

G2. Embodiment 3 of Backlight Decision Process:

FIGS. 15(a) and 15(b) illustrate the backlight decision process in this embodiment. IMG15 in FIG. 15(a), like IMG12 in FIG. 12(a), shows an image created under backlit conditions, and has the light source, i.e. the sun S, located behind a human figure H, so that human figure H is dark. In image IMG15, a subject area center SAC and a subject area SA are established.

FIG. 15(b) illustrates the backlight decision process in this embodiment. In this embodiment, it is judged that backlighting is present when the following three conditions are met.

Condition (a1): There was no illumination from a supplemental light source when the image data was generated.

Condition (a2): Subject distance is equal to or less than a threshold value.

Condition (b1): Average brightness value BAave in the subject area is equal to or less than a value obtained by multiplying an average brightness value for the entire image by a coefficient k.

The difference from the backlight decision process shown in FIG. 14(b) is the additional condition (a2). Where conditions (a1) and (b1) are met, a decision that backlighting is present is made just as in Embodiment 2 shown in FIG. 14(b). Where condition (a1) is not met, that is, where illumination has been provided by a supplemental light source, a further decision is made on the basis of condition (a2). The decision regarding condition (a2) is made based on the parameter value for subject distance obtained from the image generation record information GI. If subject distance, distance between the image generating device and a subject, is far, illumination provided by a flash may not sufficiently improve brightness in some instances. In such cases, it is preferable to carry out backlight adjustment processing even if illumination has been provided by a supplemental light source. In this embodiment, condition (a2) is determined to have been met if subject distance is equal to or less than a threshold value. Where condition (a2) has been met, a further decision is made based on condition (b1) just as in Embodiment 1 described earlier, and if it decided that backlighting is present, backlight adjustment processing is performed. By executing a decision regarding condition (a2) using subject distance in this way, an image in which illumination has been provided by a supplemental light source, but whose brightness has not been sufficiently improved thereby, may be selected as a target for backlight adjustment processing. The threshold value for deciding the size of subject distance may be determined based on sensory test of image output results. For example, a threshold value of 2 meters could be used.

Condition (a2) based on subject distance can be considered to be based on the quantity of light falling on a subject. If subject distance is less than a threshold value, a large quantity of light falls on the subject, improving its brightness. On the other hand, where subject distance is equal to or greater than a threshold value, the quantity of light is not sufficient to improve subject brightness in some instances. That is, in condition (a2), the threshold value is the criterion for determining the magnitude of the quantity of light falling on a subject. Thus, by adjusting this threshold value on the basis of other parameter values that can alter the quantity of light falling on a subject, more appropriate backlight decisions can be made. For example, an arrangement whereby threshold value increases in association with higher flash intensity in image generation record information GI can be used. By so doing, backlight decisions can be made appropriately on the basis of flash intensity, i.e., the quantity of light on a subject from a supplemental light source. An arrangement whereby threshold value decreases in association with higher aperture value (F number) is also possible. A larger F number means less light entering the image generating device. In other words, a larger F number means a smaller apparent quantity of light on a subject. Thus, by reducing the threshold value at larger F numbers, backlight decisions can be made more appropriately. An arrangement whereby threshold value increases in association with higher ISO speed rating is also possible. ISO speed rating is an index of the sensitivity of an optical circuit, and a larger value means a greater apparent quantity of light entering the image generating device, i.e., a greater apparent quantity of light on a subject. Thus, by increasing the threshold value at higher ISO speed ratings, backlight decisions can be made more appropriately.

Figure 16A:
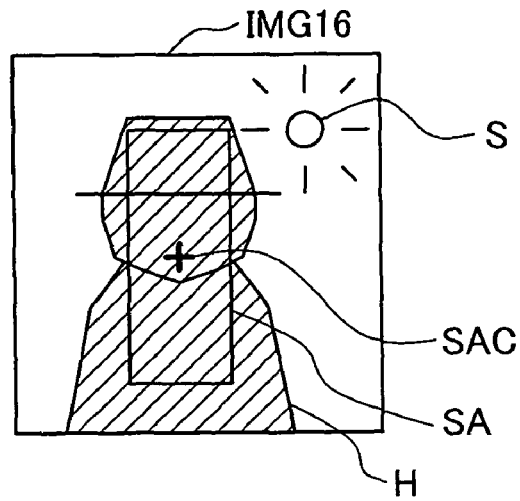
FIGS. 16(a) and 16(b) illustrate the fourth embodiment of a backlight decision process.
Figure 16B:
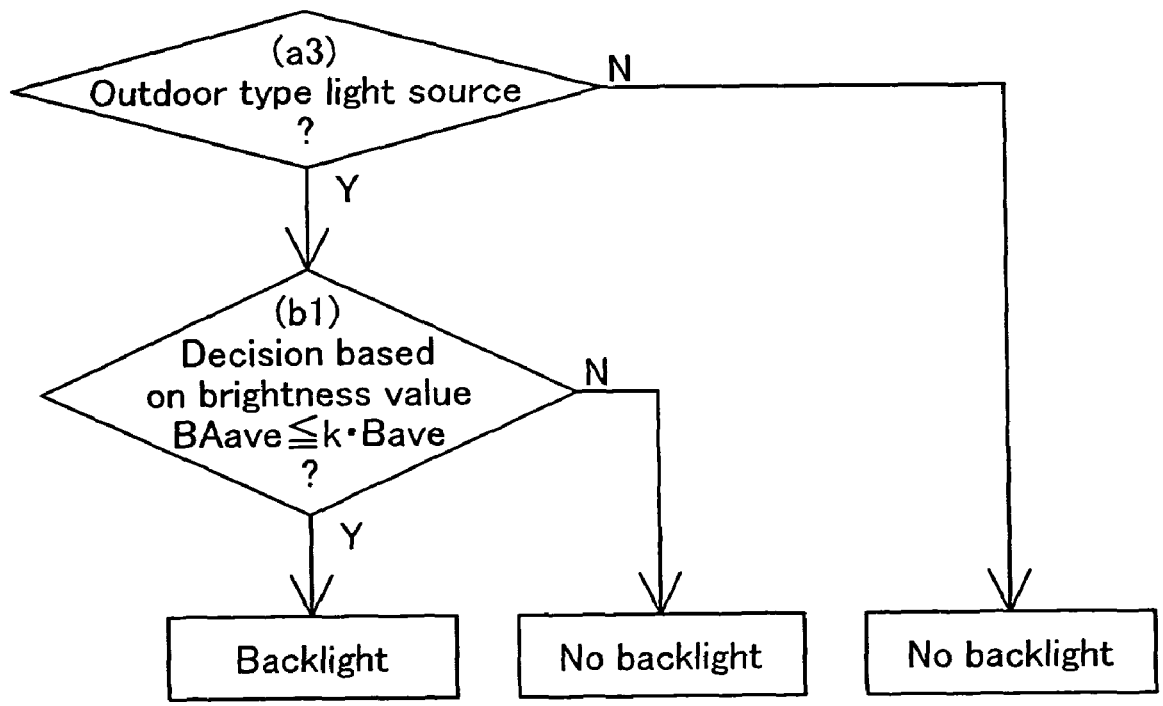

G3. Embodiment 4 of Backlight Decision Process:

FIGS. 16(a) and 16(b) illustrate the backlight decision process in this embodiment. IMG16 in FIG. 14(a) is the same as IMG12 in FIG. 12(a). In this embodiment, it is judged that backlighting is present when the following two conditions are met.

Condition (a3): The light source type is an outdoor type.

Condition (b1): Average brightness value BAave in the subject area is equal to or less than a value obtained by multiplying an average brightness value for the entire image by a coefficient k.

Condition (b1) is the same as that in Embodiment 1. Decisions as to condition (a3) are made on the basis of light source information acquired from image generation record information GI. The sun is usually the light source when a subject is outdoors. Since the position of the sun cannot be set as desired in some instances, generation of image data under backlit conditions may be unavoidable. Further, since sun light is intense, subjects under backlit conditions tend to be very dark. On the other hand, where a subject is indoors, artificial illumination is usually the light source. Since the position an artificial light source can usually be set as desired, it is relatively easy to avoid backlighting during shooting. In this embodiment, where the light source is determined to be of outdoor type, for example, daylight, clear sky, cloudy, or shade, condition (a3) is determined to be met. Where condition (a3) based on light source information is met, i.e., where the subject is outdoors, a decision based on condition (b1) is then made in the same way as in Embodiment 1; and where backlighting is determined to be present, backlight adjustment processing is performed. On the other hand, where the light source is determined to be of indoor type, for example, either fluorescent or tungsten, condition (a3) is determined not to be met, and backlight adjustment processing is not performed. By executing decisions on the basis of light source information in this way, an image whose subject is outdoors may be selected as a target for backlight adjustment processing. Additionally, by making a decision with condition (a3) using only the light source information and with condition (b1) using both subject area information and image data GD, images in which the intended subject is dark may be selected more appropriately as targets for backlight adjustment processing.

By using some suitable combination of decision conditions based on image generation record information GI, for example, conditions (a1)-(a3) in the preceding embodiments, more appropriate decisions can be made. For example, in this embodiment, an image determined to not meet condition (a3) may be subject additionally to the decision shown in FIG. 14(b) or FIG. 15(b). By so doing, appropriate decisions can be made based on flash information, even for images that have been shot outdoors.

Figure 17A:
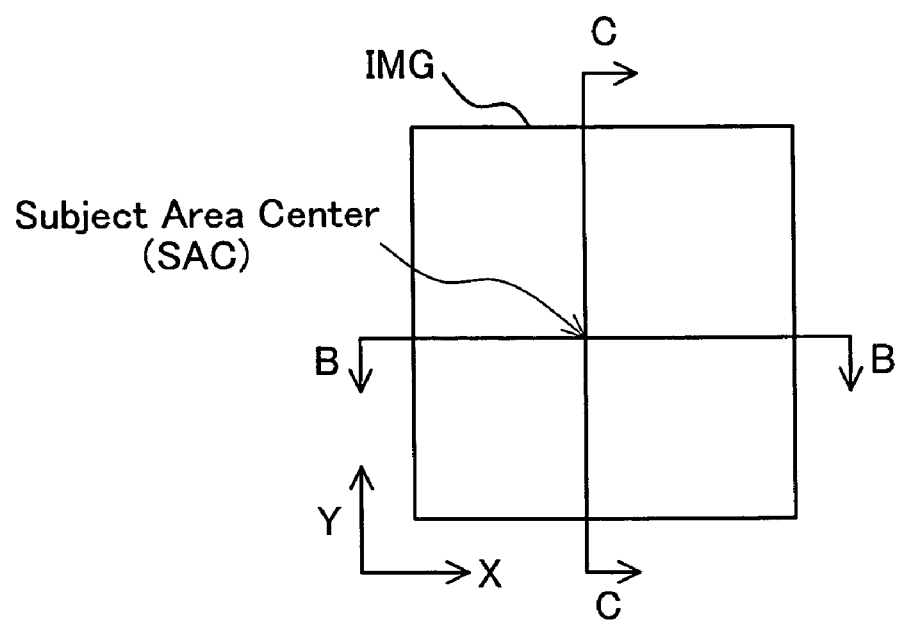
FIGS. 17(a)-17(c) illustrate a weight W distribution for use in calculating average brightness value in the fifth embodiment of a backlight decision process.
Figure 17C:
Figure 17B:
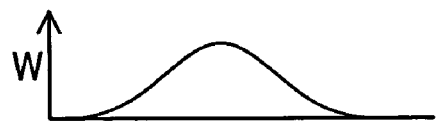

G4. Embodiment 5 of Backlight Decision Process:

FIGS. 17(a)-17(c) illustrate a weight W distribution for use in calculating average brightness value in this embodiment. FIG. 17(b) shows an X direction weight W distribution taken along line B-B in the image IMG of FIG. 17(a); and FIG.

17(c) shows a Y direction weight W distribution taken along line C-C in the image IMG of FIG. 17(a) In this embodiment, a weighted average value for brightness value is calculated using a weight W distribution that weights more heavily pixels closer to the subject area center SAC of image IMG, and the output target decision process is performed using this weighted average.

Figure 18A:
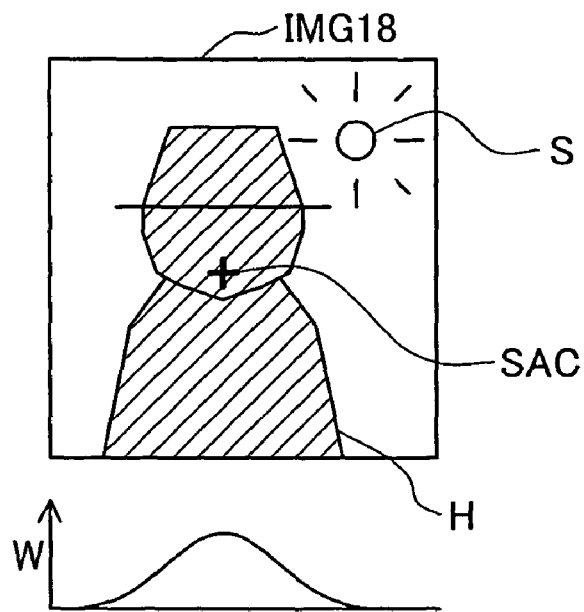
FIGS. 18(a) and 18(b) illustrate the fifth embodiment of a backlight decision process.
Figure 18B:
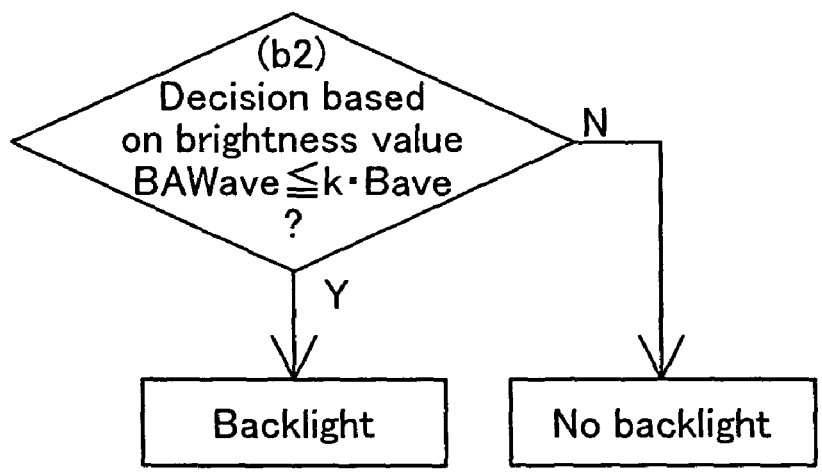

FIGS. 18(a) and 18(b) illustrate the backlight decision process in this embodiment. Image IMG18 in FIG. 18(a) is the same as image IMG12 in FIG. 12(a). Below image IMG18 is shown an X direction distribution of weight W, shown in FIG. 17(b). The Y direction distribution is not shown. Weighted average brightness value obtained using this weight W is greater in a backlit image which, like image IMG18, is darker in proximity to the center of the subject area.

FIG. 18(b) shows the backlight decision process of this embodiment. In this embodiment, it is judged that backlighting is present when the following condition is met.

Condition (b2): Weighted average brightness value BAWave in the subject area is equal to or less than a value obtained by multiplying an average brightness value for the entire image Bave by a coefficient k.

Specifically, a decision that backlighting is present is made when brightness around the subject area center is lower than the overall image brightness. A value determined based on sensory test of image output results may be used as coefficient k. For example, a value of 0.6 may be used as a predetermined coefficient k. The decision as to condition (b2) differs from that for decision condition (b1) described previously in that the subject area center is used instead of the subject area. Thus, a decision can be made even for an image in which no subject area has been established. The decision as to condition (b2) is made by analyzing the image data GD while assigning greater weight to the subject area center, i.e., the subject position, and smaller weight to positions further away from the subject area center, and using the weighted average BAWave obtained as the result of the analysis. By making decisions using subject area information in this way, images in which the subject at an intended location is dark can be selected appropriately as targets for backlight adjustment processing.

The overall average Bave can be calculated using another weight distribution having smaller magnitude for pixels close to the subject area center. Such a weight distribution can be obtained by subtracting the above weight from a constant. By so doing, brightness in proximity to the subject area center, i.e. subject location brightness, and brightness in the surrounding area may be compared more precisely.

By using a suitable combination of decision condition (b2) with other decision conditions based on image generation record information GI, for example, conditions (a1)-(a3) in the preceding embodiments, more appropriate decisions can be made. For example, in the preceding embodiments, this decision condition (b2) could be used instead of decision condition (b1).

Figure 19A:
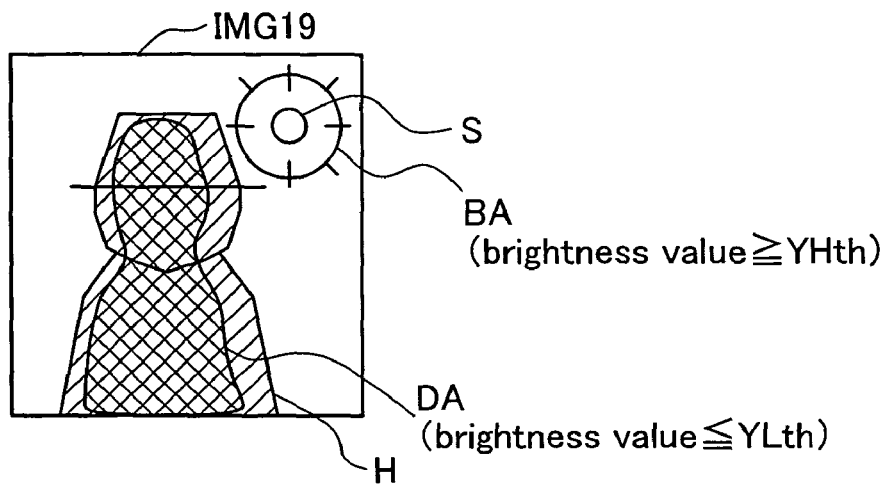
FIGS. 19(a) and 19(b) illustrate the sixth embodiment of a backlight decision process.
Figure 19B:
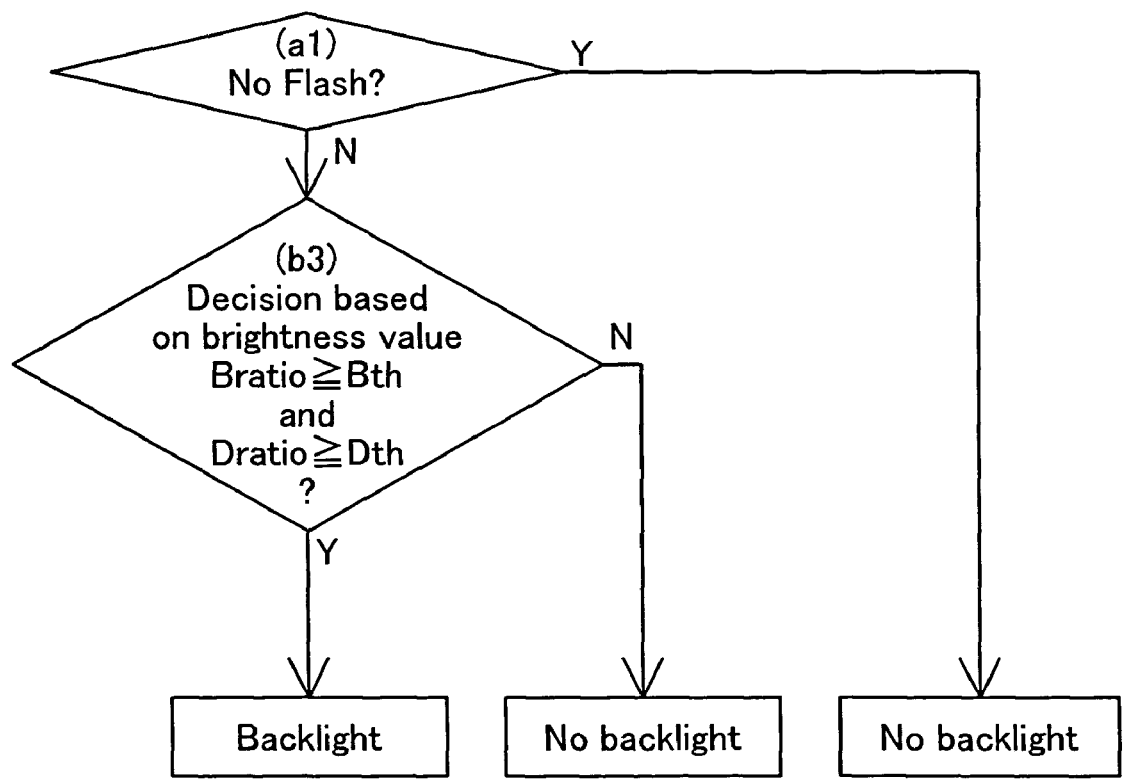

G5. Embodiment 5 of Backlight Decision Process:

FIGS. 19(a) and 19(b) illustrate the backlight decision process in this embodiment. IMG19 in FIG. 19(a), like IMG12 in FIG. 12(a), shows an image in backlit conditions. In image IMG19 are shown a bright area BA whose brightness value is equal to or greater than a brightness threshold value YHth, and a dark area DA whose brightness value is equal to or less than a darkness threshold value YLth. In this way, in a backlit image, pixels of high brightness value and pixels of low brightness value are numerous.

FIG. 19(b) shows the backlight decision process in this embodiment. In this embodiment, it is judged that backlighting is present when the following conditions are met.

Condition (a1): There was no illumination from a supplemental light source when the image data was generated.

Condition (b3): The proportion Bratio of pixels whose brightness value is equal to or greater than brightness threshold value YHth is equal to or greater than a threshold value Bth (bright pixel proportion threshold value Bth), and the proportion Dratio of pixels whose brightness value is equal to or greater than darkness threshold value YLth is equal to or greater than another threshold value Dth (dark pixel proportion threshold value Dth).

Condition (a1) is the same as that in Embodiment 2 described previously. In contrast to the aforementioned condition (b1) and condition (b2), the decision regarding condition (b3) is made by analyzing image data GD only. In an image generated under backlit conditions, both bright areas and dark areas are present, and thus the proportion of bright pixels and the proportion of dark pixels tend to be high. By means of a decision based on condition (b3), such an image may be selected as a target for backlight adjustment processing. The threshold values YHth, YLth, Bth, and Dth may be determined based on sensory test of image output results. For example, where the range of possible brightness values is 0-255, a brightness threshold value YHth of 200 and a darkness threshold value YLth of 50 would be acceptable. Bright pixel proportion threshold value Bth may be set to 20% of total pixels, and dark pixel proportion threshold value Dth to 30% of total pixels.

The decision regarding condition (b3) in this embodiment can be made without using subject area information. Thus, backlight decisions can be made even where image generation record information GI does not include subject area information. In this embodiment, backlight decisions are made using not only condition (b3) decided on by analysis of image data GD, but condition (a1) decided on using flash information, i.e. image generation record information GI, so more appropriate backlight decision results for images can be obtained. Various conditions other than condition (a1) could be used as decision conditions based on image generation record information GI. For example, more appropriate decisions could be made through suitable combination of conditions (a1)-(a3) in the preceding embodiments. In any event, more appropriate decisions could be made by combining decisions made through analysis of image data GD only, with decisions made using image generation record information GI. Decisions based on image data GD only are not limited to condition (b3); other conditions enabling a decision to be made as to whether backlit conditions have resulted in dark areas are acceptable. For example, pixels in an image could be divided into a number of blocks, and brightness values for the blocks may be used as average brightness value for the block. A decision that backlighting is present may be made where the proportion of bright blocks whose brightness value is equal to or greater than threshold value YHth and the proportion of dark blocks whose brightness value is equal to or less than threshold value YLth are each equal to or greater than their predetermined threshold values.

Figure 20A:
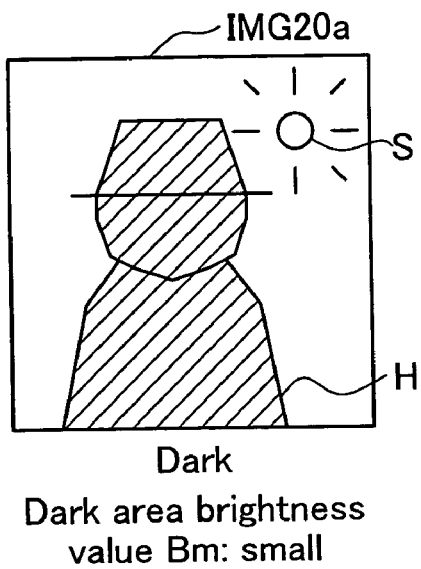
FIGS. 20(a)-20(c) illustrate the second embodiment of backlight adjustment processing.
Figure 20B:
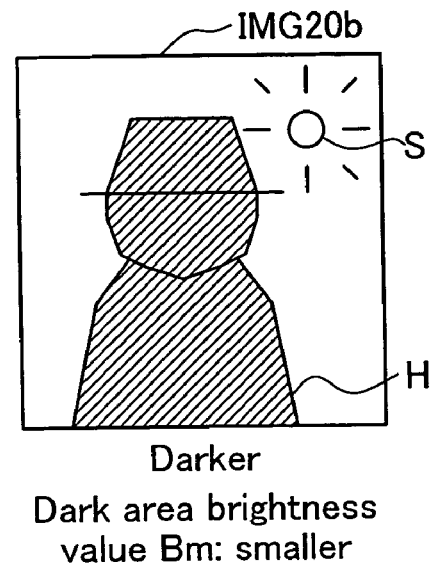
Figure 20C:
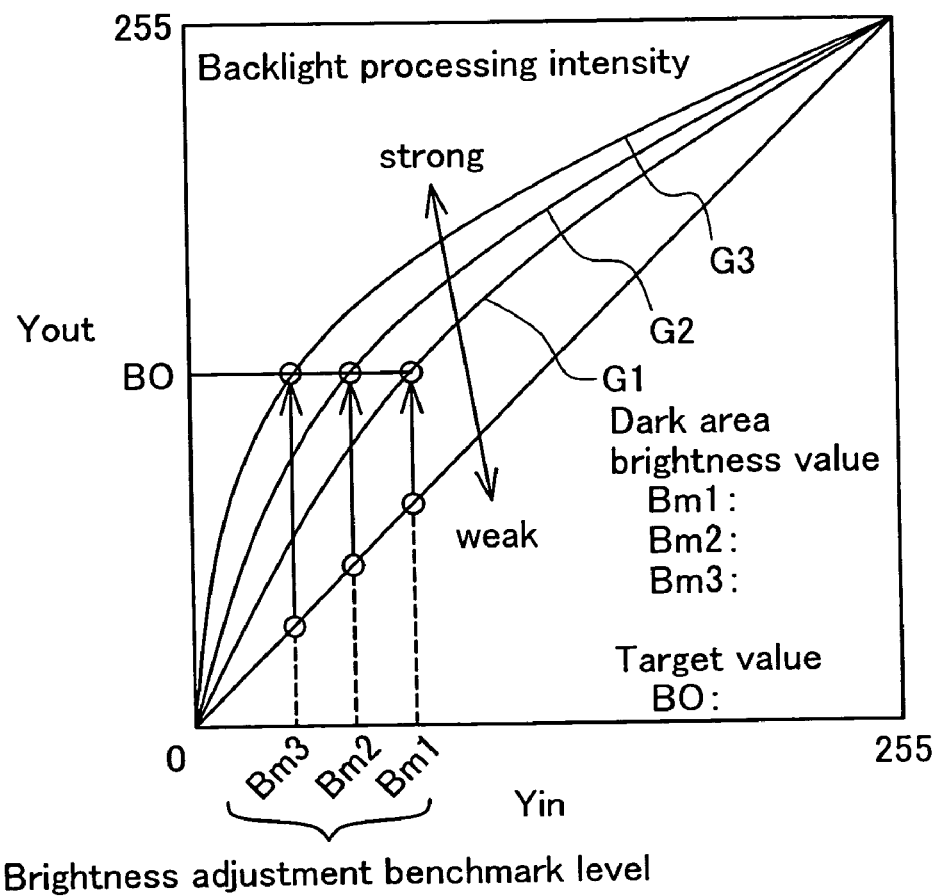

H. Other Embodiments of Backlight Adjustment Processing:

H1. Embodiment 2 of Backlight Adjustment Processing:

FIGS. 20(a)-20(c) illustrate the backlight decision process in this embodiment. The two images IMG20a, IMG20b in FIGS. 20(a) and 20(b), like the image IMG12 shown in FIG. 12(a), show images under backlit conditions. In the two images IMG20a, IMG20b, a human figure H appears dark due to being backlit. The human figure H in image IMG20b appears darker than that in image IMG20a. Thus, pixels with low brightness value are more numerous in image IMG20b than in image IMG20a. As an index of the degree of brightness of a dark area in such an image, it is possible to use, for example, a pixel brightness value whose brightness value magnitude rank in the image is a predetermined rank (20% of total pixels, for example) counting from the lowest brightness value (hereinafter termed "dark area brightness value"). For example, when the image includes 100 pixels, brightness of the pixel whose brightness is the 20th from the lowest is used as the dark area brightness value Bm. Such a dark area brightness value Bm will be small in a backlit image like image IMG20a, and even smaller in a darker image like IMG20b.

FIG. 20(c) shows the relationship of brightness value input level Yin to brightness value output level Yout in backlight adjustment processing of this embodiment. In graph G1, the amount of increase in brightness value is adjusted such that where input level Yin is equal to the dark area brightness value Bm1, output level Yout is raised to a predetermined target value BO higher than the original value. Hereinafter, the input level serving as the benchmark for raising the brightness value is termed "the brightness adjustment benchmark level." Output levels Yout corresponding to other input levels Yin are interpolated using a spline function. By adjusting brightness values using this graph G1, brightness in dark areas can be improved.

Graphs G2 and G3 show input/output characteristics used for backlight adjustment processing with greater intensity than graph G1. Here, "backlight adjustment processing intensity" refers to the extent of increase in brightness value, particularly of increase in brightness value in dark areas. Graph G2 is used when a brightness adjustment benchmark level, i.e., dark area brightness value, Bm2 is smaller than Bm1. The amount of increase in brightness value is adjusted such that where input level Yin is equal to Bm2, output level Yout is raised to the predetermined target value BO. Using graph G2, more intense backlight adjustment processing than with graph G1 can be carried out. Graph G3 is used when a brightness adjustment benchmark level Bm3 is even smaller than Bm2. Using graph G3, more intense backlight adjustment processing than with graph G2 can be carried out. In this embodiment, backlight adjustment processing intensity can be determined through analysis of image data GD alone.

By adjusting backlight adjustment processing intensity based on an index that indicates the degree of brightness in dark areas of an image in this way, backlight adjustment processing can be performed with intensity that is appropriate to the brightness of a particular dark area. That is, the lower the degree of brightness in a dark area (i.e. the darker it is), the more intense can be the backlight adjustment processing performed on it. Various other indexes other than dark area brightness value can be used as indexes for the degree of brightness in dark areas. For example, the proportion of dark pixels having brightness values below a predetermined threshold value may be used. In this case, the greater the proportion of dark pixels, the more intense will be the backlight adjustment processing. In any case, by adjusting backlight adjustment processing to a more intense level the lower the degree of brightness in a dark area (i.e. the darker it is), backlight adjustment processing can be performed with intensity appropriate to the brightness of a particular dark area. As the predetermined target value BO, a value determined through sensory test of image output results may be used. For example, where the range of possible brightness values is 0-255, the median value of 128 may be used as the target value BO.

Figures 21A, 21B:
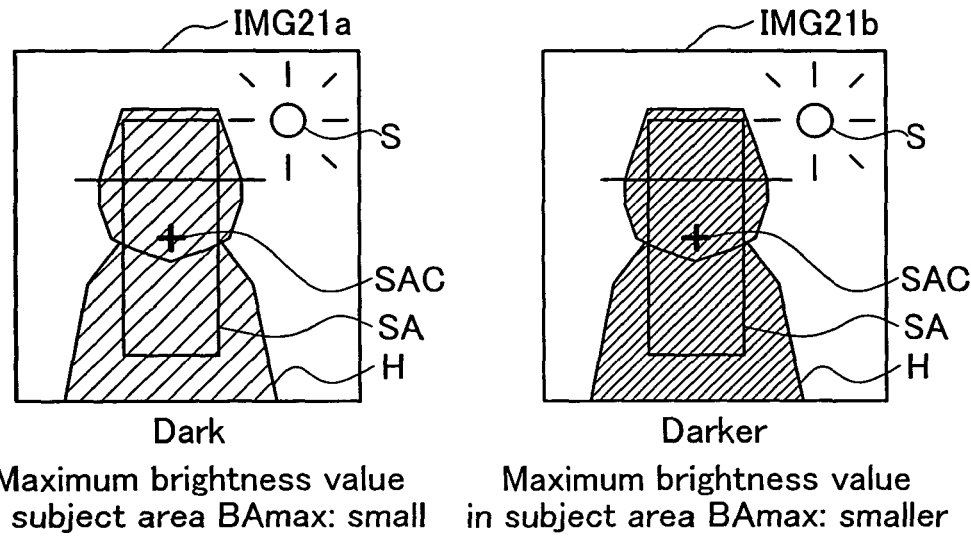
FIGS. 21(a)-21(c) illustrate the third embodiment of backlight adjustment processing.
Figure 21C:
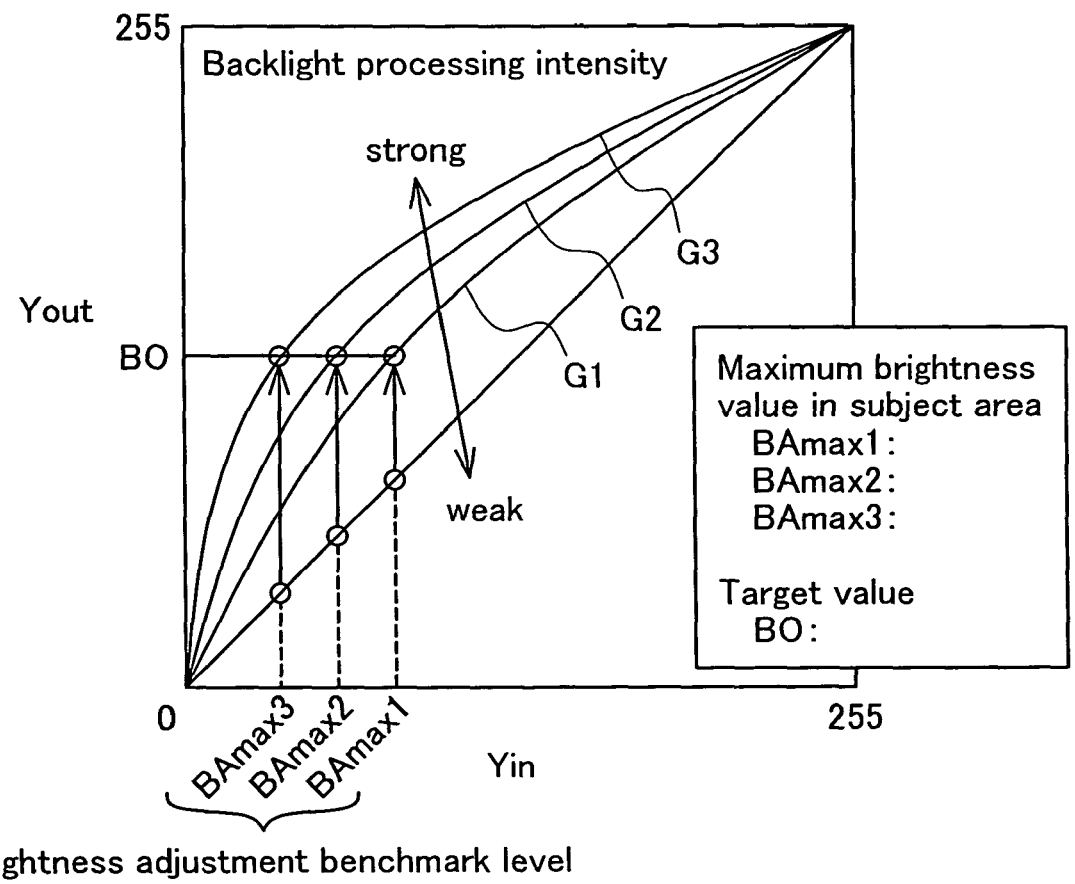

H2. Embodiment 3 of Backlight Adjustment Processing:

FIGS. 21(a)-21(c) illustrate the backlight decision process in this embodiment. The two images IMG21a, IMG21b shown in FIGS. 21(a) and 21(b), unlike the images IMG20a, IMG20b shown in FIGS. 20(a) and 20(b), include information for a subject area center SAC and a subject area SA. A human figure H that is dark due to being backlit is shown in each of the two images IMG21a, IMG21b. The human figure H in image IMG21b appears darker than that in image IMG21a. Thus, pixels with low brightness value are more numerous in image IMG21b than in image IMG21a. An index indicating the degree of brightness in such a backlit image may be determined using subject area information. As an index indicating brightness of a dark area, there may be used the maximum brightness value BAmax within the subject area. Such a maximum brightness value BAmax will be small in a backlit image like image IMG21a, and even smaller in a darker backlit image like image IMG21b.

FIG. 21(c) shows the relationship of brightness value input level Yin to brightness value output level Yout in backlight adjustment processing of this embodiment. A difference from the example shown in FIG. 20(c) is that the maximum brightness value in the subject area is used as the brightness adjustment benchmark level. In graph G1, the amount of increase in brightness value is adjusted such that where input level Yin is equal to BAmax1 (maximum brightness value in the subject area), brightness value output level Yout is raised to a predetermined target value BO. Graph G2 depicts an input-output function used where the brightness adjustment benchmark level is BAmax2, which is smaller than BAmax1; and graph G3 depicts an input-output function used where the brightness adjustment benchmark level is BAmax3, which is even smaller than BAmax2. In this way, since the intensity of backlight adjustment processing is greater the smaller the maximum brightness value in a subject area, brightness in a subject area can be improved appropriately. It should be noted that, in this embodiment, backlight adjustment processing intensity is determined using both image data GD and subject area information, that is, image data GD and image generation record information GI. In other words, the intensity of backlight adjustment processing is determined based on the results of analyzing image data GD while assigning zero weight to the area outside the subject area. That is, the image data GD is analyzed using a weight distribution of different magnitude in the subject location (subject area center) than in the area outside the subject area.

By adjusting processing intensity based on an index that indicates the brightness in a dark area, backlight adjustment processing can be performed with the intensity appropriate to the brightness of a subject area. Various values other than maximum brightness value in the subject area can be used as indexes of brightness in a dark area. For example, the average brightness value for the subject may be used as the index. By so doing, more appropriate adjustment of backlight adjustment processing intensity may be accomplished even where a subject area includes a bright area. A weighted average brightness value calculated using the weight W distribution shown in FIGS. 17(a)-17(c) can also be used as an index. In this case, average brightness value is calculated using the subject area center rather than the subject area, so more appropriate adjustment of processing intensity may be accomplished based on brightness values in proximity to the subject, even for an image in which no subject area has been established. In any case, by adjusting backlight adjustment processing to a more intense level the lower the degree of brightness in a subject area (i.e. the darker it is), backlight adjustment processing can be performed at intensity appropriate to the brightness of a particular subject area.

H3. Variant Examples of Backlight Adjustment Processing:

In the embodiments described above, the target value BO for raising brightness value is a predetermined value, but it can instead be a value adjusted based on an index that indicates the degree of brightness in a dark area within an image. For example, the target value BO may be increased as the dark area brightness value decreases. By so doing, the intensity of backlight adjustment processing can be increased with reference to darker brightness of a dark area, so that brightness can be improved. Target value BO may also be increased as the maximum brightness value within a subject area decreases. By so doing, the intensity of backlight adjustment processing can be increased with reference to darker brightness of a subject area, so that brightness can be improved. Alternatively, a number of brightness value adjustment benchmark levels may be devised, and the target value for raising brightness value set on a level-by-level basis. For example, brightness value adjustment benchmark levels may be set to correspond to average brightness value and maximum brightness value in a subject area, respectively, and the amount of increase in brightness value may be adjusted accordingly. By so doing, finer adjustment of brightness value becomes possible. Or, the aforementioned brightness value adjustment benchmark level may be a predetermined value, and instead, the target value BO for raising brightness value adjusted based on an index of the dark area. In any case, by adjusting backlight adjustment processing to a more intense level the lower the degree of brightness in a dark area (i.e. the darker it is) produced by backlighting, backlight adjustment processing can be performed at intensity appropriate to the brightness of a particular subject area.

Figure 22:
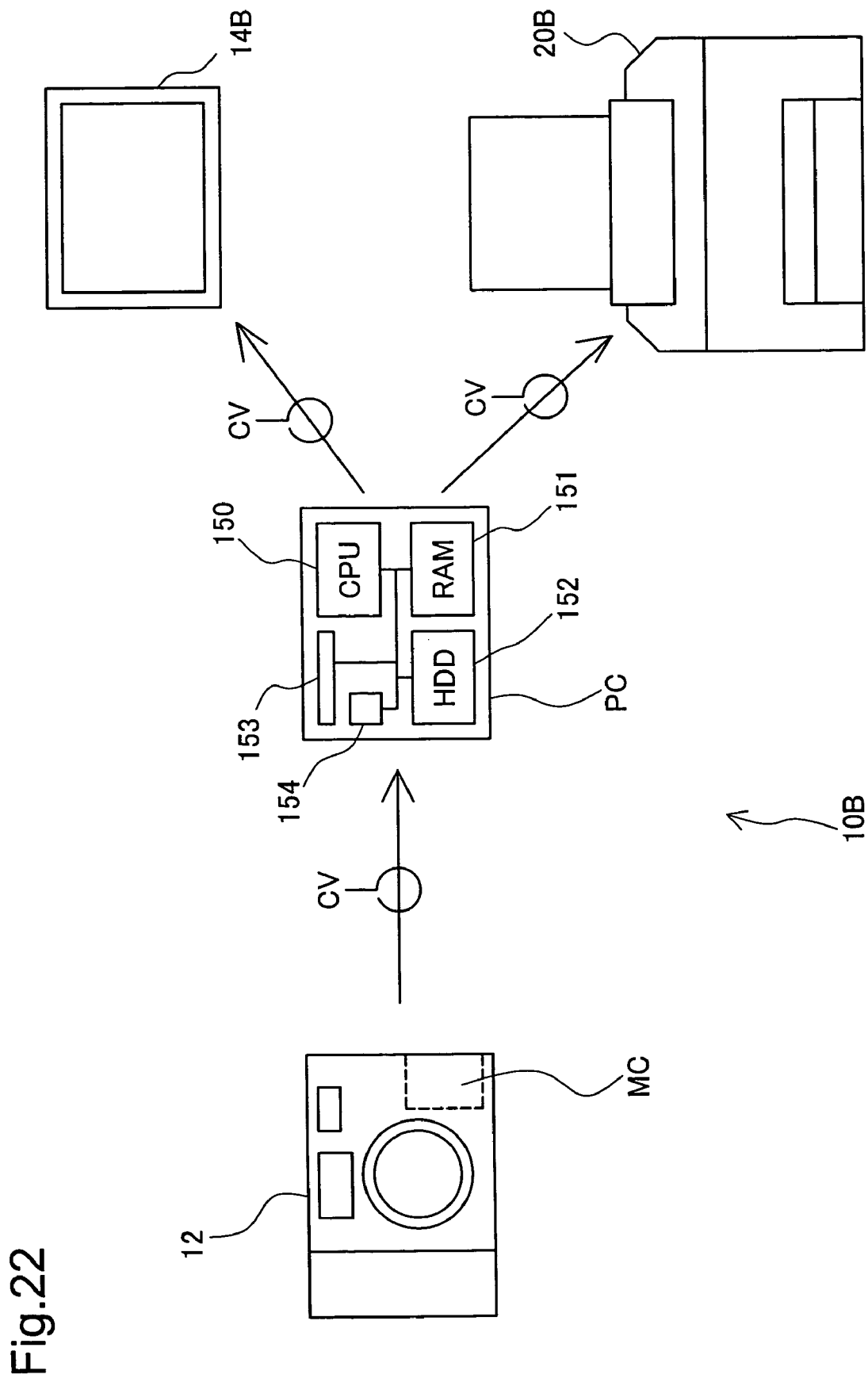
FIG. 22 illustrates an example of an image output system.

I. Arrangement of Image Output System Employing Image Data Processing Device:

FIG. 22 is an explanatory diagram showing an example of an image output system in which an image data processing device may be implemented by way of an embodiment of the present invention. Image output system 10B comprises a digital still camera 12 as an image generating device for generating image files; a computer PC for executing image quality adjustment processing based on an image file; and a printer 20B as an image output device for outputting images. Computer PC functions as an image data processing device. As the image output device, a CRT display, LCD display, or other monitor 14B, and a projector may be used instead of printer 20B. In the following description, it is assumed that printer 20B is used as the output section. This embodiment differs from the image output system embodiment described previously (FIG. 1) in that the image processing device including a judging section and an image quality adjuster is constructed separately from the output section. Combination of the computer PC serving as the image data processing device and the printer serving as the output section can be termed an "image output device" in the broad sense.

An image file created in digital still camera 12 is transferred to computer PC via a cable CV, or by directly inserting into computer PC a memory card MC having the image file stored thereon. Computer PC executes image quality adjustment processing of the image data based on the read out image file. The image data produced by image quality adjustment processing is transferred to printer 20B via a cable CV, and output by printer 20B.

Computer PC comprises a CPU 150 for executing a program that realizes the aforementioned image quality adjustment processing; RAM 151 for temporarily storing results of operations by CPU 150; and a hard disk drive (HDD) 152 for storing data needed for image quality adjustment processing, such as an image quality adjustment processing program, lookup tables, and aperture value tables. CPU 150, RAM 151, and HDD 152 as a whole function as a judging section and image quality adjuster. Computer PC further comprises a memory card slot 153 for installing a memory card MC; and an input/output terminal 154 for connecting a connector cable from digital still camera 12.

An image file GF generated by a digital still camera 12 is supplied to computer PC via a cable or via a memory card MC. When an image data processing application program, either an image retouching application or a printer driver, is started up by user control, CPU 150 executes an image processing routine (FIG. 9) to process the read in image file GF. Alternatively, the image data processing application program may be set to start up automatically when a memory card MC is inserted into memory card slot 153, or when connection of a digital still camera 12 to input/output terminal 154 via a cable is detected.

Image data processed by CPU 150, rather than being output in Step S250 of the image processing routine (FIG. 9), is instead transferred to an image output device, for example, printer 20B, whereupon the image output device receiving the image data executes image output.

In this embodiment, image processing is carried out using a judging section and image quality adjuster realized by computer PC, whereby an output device not equipped with a judging section and image quality adjuster may be used. Where the output device is equipped with a judging section and image quality adjuster, image data may be transferred directly to the output device without being processed by the computer PC, and the image is processed by the judging section and image quality adjuster of the output device.

As described in the embodiments hereinabove, image quality of an image containing a dark area produced by backlighting may be adjusted automatically, thereby readily producing high quality image output.

J. VARIANT EXAMPLES

J1. Variant Example 1

An arrangement whereby one or more conditions for a backlight adjustment processing decision are selected from among a number of decision conditions according to information included in the image generation record information GI is also possible. For example, where image generation record information GI includes flash information and subject distance information, the decisions can be made based on conditions (a1) (a2) and (a3); and where image generation record information GI includes flash information and subject area information, the decisions can be made based on conditions (a1) and (b1). By selecting conditions according to information included in image generation record information GI, more appropriate decisions can be made.

J2. Variant Example 2

As information relating to the distance between a subject and the image generating device, employed in condition (a2), another distance information indicating a distance range can be used instead. For example, the decision regarding condition (a2) can be made using subject distance range information set by selecting from among three distance ranges, macro (0-1 m), close-view (1-3 m), or distant-view (3 m or over). In this case, the decision regarding condition (a2) can be made by pre-determined typical distance for each of the distance ranges, and comparing the typical distance with a threshold value for condition (a2). As a typical distance, for example, for a distance range having an upper limit value and a lower limit value established for distance, the intermediate value could be used; or for a distance range having only an upper limit value or a lower limit value established, the upper limit value or lower limit value could be used.

J3. Variant Example 3

Where image data is generated with a supplemental light source and the image generating device situated at separate locations, it is preferable to make the decision regarding condition (a2) based on information relating to the distance between the supplemental light source and the image generating device, rather than subject distance. By so doing, images containing dark areas due to a large distance between supplemental light source and subject may be selected as targets for backlight adjustment processing.

Figure 23:
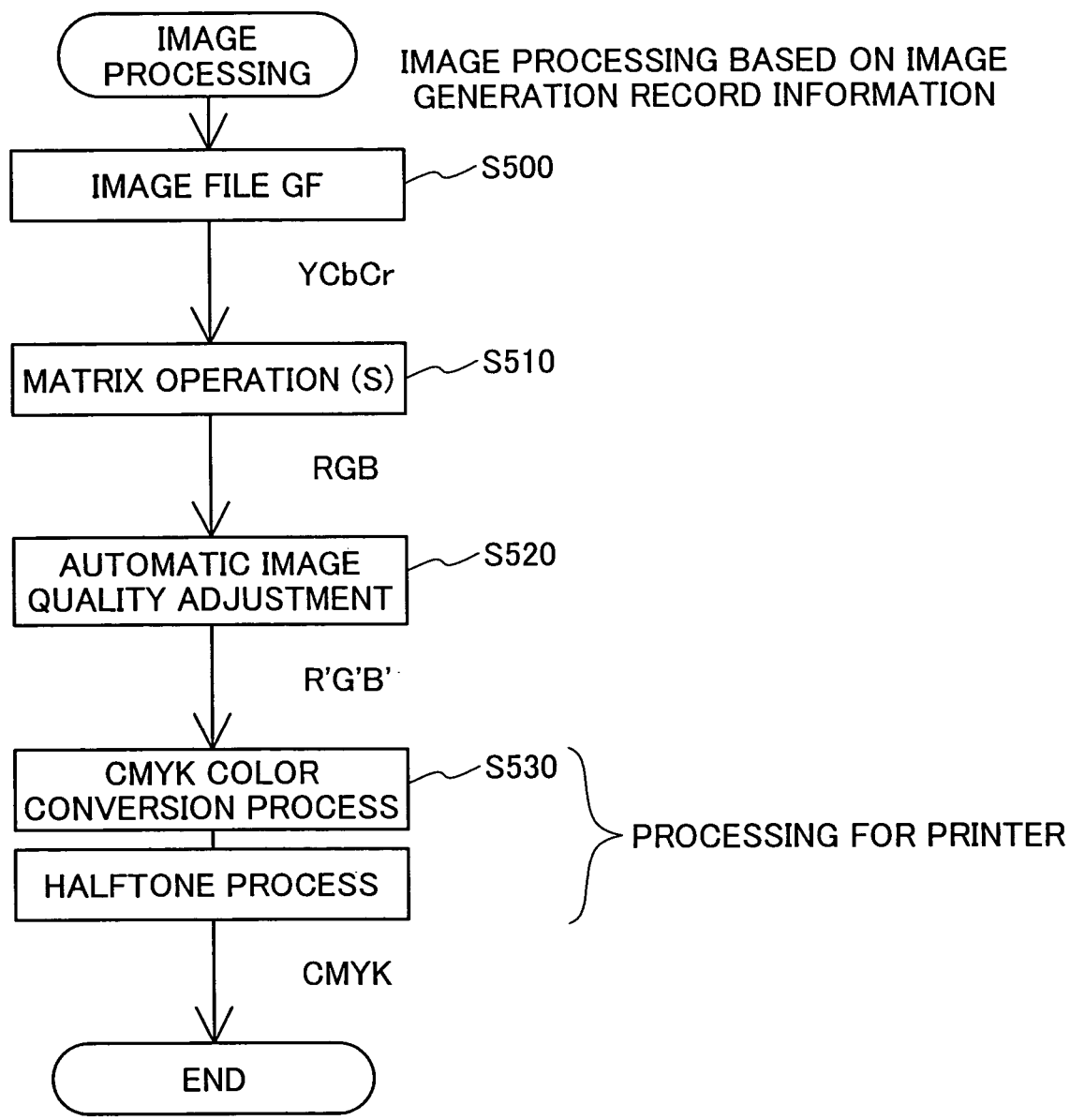
FIG. 23 is a flow chart showing an image processing routine.

J4. Variant Example 4

Where an image file GF does not include an image data gamma value or color space information, the color space conversion process of the image processing routine shown in FIG. 10 (Step S320 and Step S330) can be omitted. FIG. 23 is a flow chart showing an image processing routine from which the color space conversion process has been omitted. Image data acquired in Step S500 is converted from image data based on a YCbCr color space to data based on an RGB color space in Step S510. Next, in Step S520, automatic image quality adjustment processing is executed using the image data obtained in Step S510. Next, in Step S530, a CYMK conversion process and halftone process for printing are executed.

J5. Variant Example 5

Figure 24:
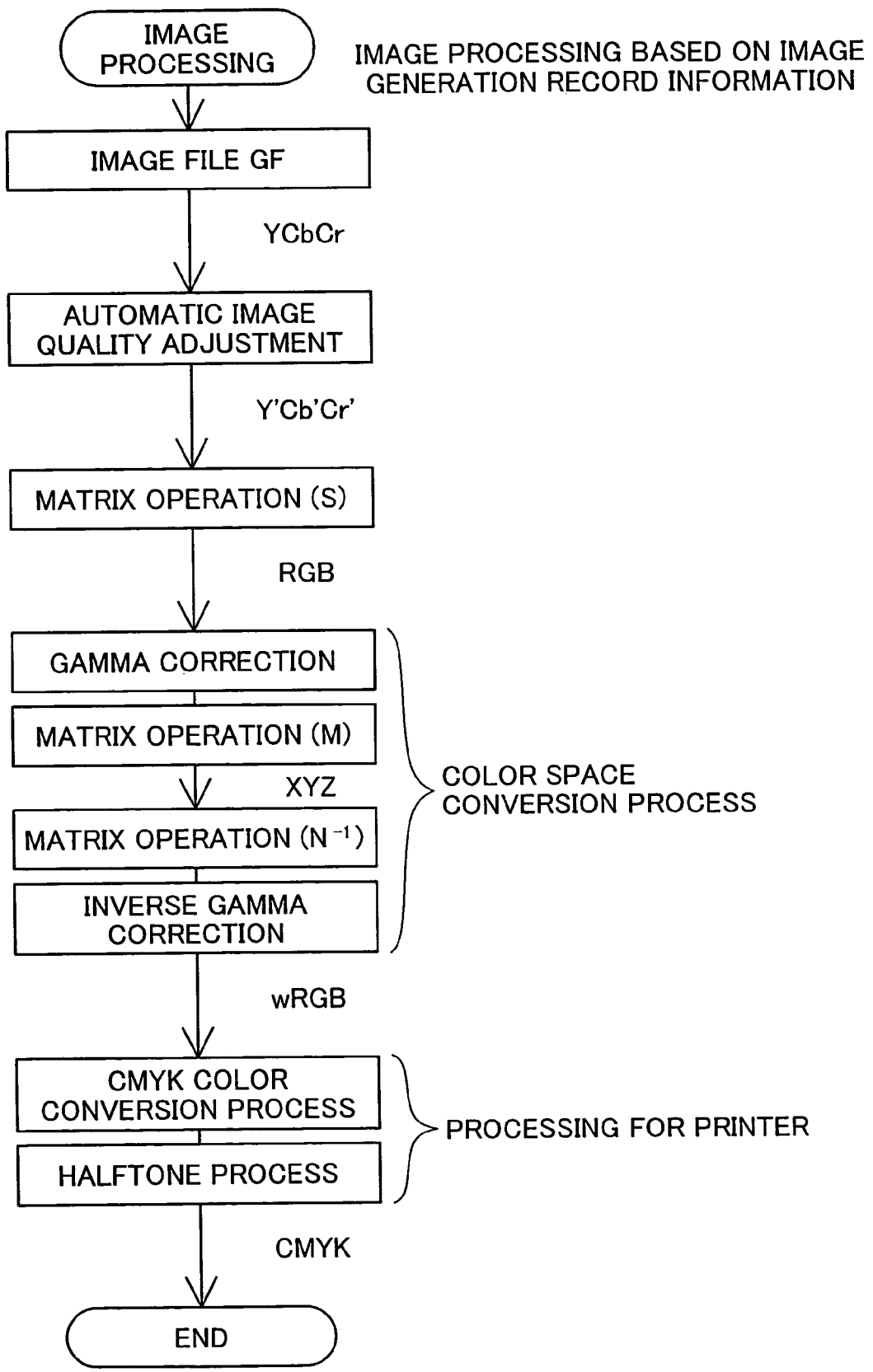
FIG. 24 is a flow chart showing another example of an image processing routine.

In the preceding embodiments, automatic image quality adjustment processing is executed after executing color space conversion, but instead color space conversion can be executed after executing automatic image quality adjustment processing. For example, image processing can be executed according to the flowchart shown in FIG. 24.

J6. Variant Example 6

Figure 25:
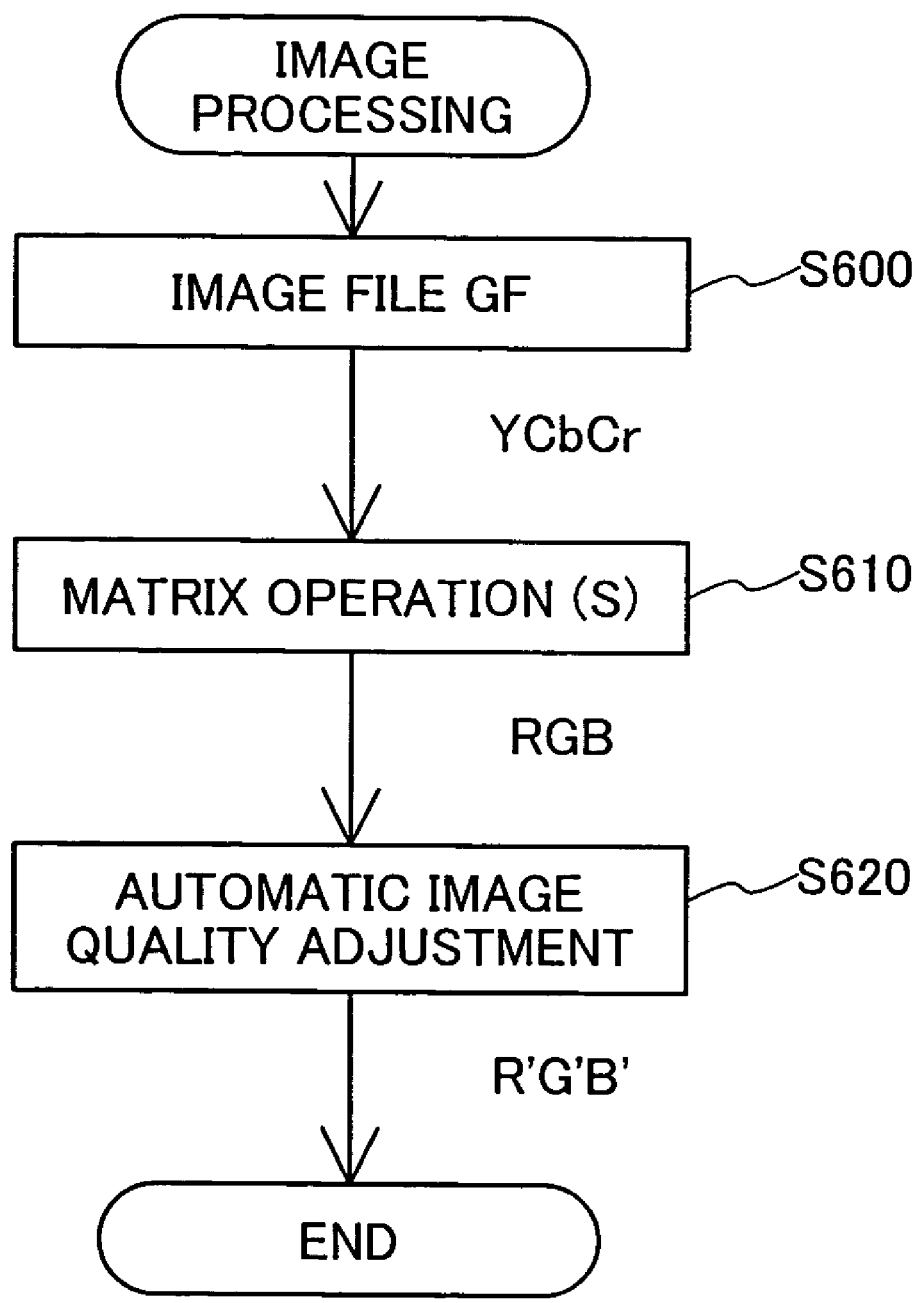
FIG. 25 is a flow chart showing another example of an image processing routine.

In the preceding embodiments, a printer is used as the output section, but an output section other than a printer could be used instead. FIG. 25 is a flowchart showing a processing routine for image processing based on image generation record information where a CRT is used as the output section. In contrast to the flowchart in FIG. 10 which depicts the use of a printer as the image output section, the CYMK conversion process and halftone process for printing are omitted. Also, since a CRT can represent an RGB color space of image data obtained by executing a matrix operation (S), the color space conversion process is omitted as well. Where image data based on an RGB color space obtained in Step S610 includes data outside the defined area of the RGB color space, the out-of-defined-area data is clipped, and then step S620 is executed. Where the color space utilizable by an image output section is different from an RGB color space, a color conversion process to a color space utilizable by the image output section is executed in a manner analogous to executing a CMYK color conversion process where a printer is used, and the resultant image is output by the image output section.

J7. Variant Example 7

In the flowchart of FIG. 11, the chroma adjusting process S430 and noise elimination process S440 performed after backlight adjustment processing S420 may be omitted. This produces a simpler arrangement for image quality processing.

J8. Variant Example 8

In the preceding embodiments, the description was made taking an Exif format file as a specific example of the image file GF, but the format of the image file pertaining to the present invention is not limited to this. That is, any image file containing image data generated by an image generating device, and image generation record information GI describing conditions at the time of generation of image data is acceptable. With such a file, image quality of image data generated by an image generating device can be appropriately adjusted automatically and output from an output device.

J9. Variant Example 9

Values of matrices S, $N^{-1}$, and M in the equations are merely exemplary, and can be modified appropriately depending on color space on which the image file is based, color space utilizable by an image output section, or the like.

J10. Variant Example 10

In the preceding embodiments, the description was made using a digital still camera 12 as the image generating device, but image files could be generated using a different image generating device, such as a scanner, and digital video camera.

J11. Variant Example 11

In the preceding embodiments, the description has been made for the example of a case where image data GD and image generation record information GI are contained in the same image file GF, but image data GD and image generation record information GI need not necessarily be stored within the same file. That is, it is sufficient for image data GD and image generation record information GI to be associated with each other; for example, it would be acceptable to generate associating data that associates image data GD with image generation record information GI; store one or several sets of image data and image generation record information GI in independent files; and refer to the associated image generation record information GI when processing the image data GD. This is because, in this case, although the image data GD and image generation record information GI are stored in separate files, at the point in time of image processing which utilizes the image generation record information GI, the image data GD and image generation record information GI are in inseparably linked, and thus function substantially the same as if they were stored in the same file. That is, the term image file GF in the present embodiment includes those of a form wherein image data GD and image generation record information GI are associated, at least at the point in time that image processing takes place. Also included are motion video files stored on optical disk media such as CD-ROM, CD-R, DVD-ROM, and DVD-RAM.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device for processing an image using image data generated by an image generating device, and image generation record information that is associated with the image data and that includes operation information of the image generating device at the time that the image data is generated, the image processing device comprising:
   a judging section configured to execute a backlight decision as to whether or not to execute backlight adjustment processing, based on both the image generation record information and the image data, wherein when the image generation record information includes subject position information indicating a position of a subject in the image, the judging section uses the subject position information in executing the backlight decision; and
   an image quality adjuster that, when it is decided to execute the backlight adjustment processing, executes backlight adjustment processing to increase brightness value of at least some pixels in the image data,
   wherein the judging section analyzes the image data with a weight distribution that has different magnitudes at the subject position and other positions to calculate a first average brightness value in a partial area including the subject position, calculates a second average brightness value for the entire image, and executes the backlight decision according to the first average brightness value and the second average brightness value.

2. An image output device for outputting an image using image data generated by an image generating device, and image generation record information that is associated with the image data and that includes operation information of the image generating device at the time that the image data is generated, the image output device comprises:
   a judging section configured to execute a backlight decision as to whether or not to execute backlight adjustment processing, based on both the image generation record information and the image data, wherein when the image generation record information includes subject position information indicating a position of a subject in the image, the judging section uses the subject position information in executing the backlight decision;
   an image quality adjuster that, when it is decided to execute the backlight adjustment processing, executes backlight adjustment processing to increase brightness value of at least some pixels in the image data; and
   an output section for outputting an image according to the image quality-adjusted image data,
   wherein the judging section analyzes the image data with a weight distribution that has different magnitudes at the subject position and other positions to calculate a first average brightness value in a partial area including the subject position, calculates a second average brightness value for the entire image, and executes the backlight decision according to the first average brightness value and the second average brightness value.

3. A method of processing an image using image data generated by an image generating device, and image generation record information that is associated with the image data and that includes operation information of the image generating device at the time that the image data is generated, the method comprising the steps of:
   (a) executing a backlight decision as to whether or not to execute backlight adjustment processing, based on both the image generation record information and the image data, wherein when the image generation record information includes subject position information indicating a position of a subject in the image, the backlight decision is made using the subject position information; and
   (b) when it is decided to execute the backlight adjustment processing, executing backlight adjustment processing to increase brightness value of at least some pixels in the image data,
   wherein the step (a) includes analyzing the image data with a weight distribution that has different magnitudes at the subject position and other positions to calculate a first average brightness value in a partial area including the subject position, calculating a second average brightness value for the entire image, and executing the backlight decision according to the first average brightness value and the second average brightness value.

4. A method of outputting an image using image data generated by an image generating device, and image generation record information that is associated with the image data and that includes operation information of the image generating device at the time that the image data is generated, the method comprising the steps of:
   (a) executing a backlight decision as to whether or not to execute backlight adjustment processing, based on both the image generation record information and the image data, wherein when the image generation record information includes subject position information indicating a position of a subject in the image, the backlight decision is made using the subject position information;
   (b) when it is decided to execute the backlight adjustment processing, executing backlight adjustment processing to increase brightness value of at least some pixels in the image data; and
   (c) outputting an image according to the image quality-adjusted image data,
   wherein the step (a) includes analyzing the image data with a weight distribution that has different magnitudes at the subject position and other positions to calculate a first average brightness value in a partial area including the subject position, calculating a second average brightness value for the entire image, and executing the backlight decision according to the first average brightness value and the second average brightness value.

5. A computer-readable storage medium encoded with a computer program, the computer program comprising:
   a first program causing a computer to execute a backlight decision as to whether or not to execute backlight adjustment processing, based on both the image generation record information and the image data, wherein when the image generation record information includes subject position information indicating a position of a subject in the image, the backlight decision is made using the subject position information; and
   a second program, when it is decided to execute the backlight adjustment processing, causing the computer to execute backlight adjustment processing to increase brightness value of at least some pixels in the image data,
   wherein the first program causes the computer to analyze the image data with a weight distribution that has different magnitudes at the subject position and other positions to calculate a first average brightness value in a partial area including the subject position, to calculate a second average brightness value for the entire image, and to execute the backlight decision according to the first average brightness value and the second average brightness value.

* * * * *